(12) United States Patent
Salehifar et al.

(10) Patent No.: US 12,501,058 B2
(45) Date of Patent: *Dec. 16, 2025

(54) IMAGE CODING METHOD ON BASIS OF SECONDARY TRANSFORM AND DEVICE THEREFOR

(71) Applicant: LG ELECTRONICS INC., Seoul (KR)

(72) Inventors: Mehdi Salehifar, Seoul (KR); Seunghwan Kim, Seoul (KR); Jaehyun Lim, Seoul (KR); Moonmo Koo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/813,296

(22) Filed: Aug. 23, 2024

(65) Prior Publication Data

US 2024/0414357 A1    Dec. 12, 2024

Related U.S. Application Data

(60) Continuation of application No. 18/100,781, filed on Jan. 24, 2023, now Pat. No. 12,088,830, which is a
(Continued)

(51) Int. Cl.
*H04N 19/18* (2014.01)
*H04N 19/176* (2014.01)
*H04N 19/184* (2014.01)
*H04N 19/46* (2014.01)
*H04N 19/60* (2014.01)
*H04N 19/91* (2014.01)

(52) U.S. Cl.
CPC .......... *H04N 19/18* (2014.11); *H04N 19/176* (2014.11); *H04N 19/184* (2014.11); *H04N 19/46* (2014.11); *H04N 19/60* (2014.11); *H04N 19/91* (2014.11)

(58) Field of Classification Search
CPC .... H04N 19/176; H04N 19/70; H04N 19/122; H04N 19/18; H04N 19/186; H04N 19/157
See application file for complete search history.

(56) References Cited

U.S. PATENT DOCUMENTS 7,167,589 B2 * 1/2007 Schwartz ........... G06K 15/1865
                                                   375/E7.064
12,170,794 B2 * 12/2024 Shima .................... H04N 19/12
(Continued)

*Primary Examiner* — Daniel Chang
(74) *Attorney, Agent, or Firm* — Bryan Cave Leighton Paisner LLP

(57) ABSTRACT

An image information decoding method performed by means of a decoding device according to the present invention comprises the steps of: decoding a non-separable secondary transform (NSST) index from a bitstream if NSST is applied to a target block; decoding information relating to transform coefficients with respect to the target block from the bitstream on the basis of the decoded NSST index; and deriving the transform coefficients with respect to the target block on the basis of the decoded information relating to the transform coefficients, wherein the NSST index is decoded prior to the information relating to the transform coefficients with respect to the target block.

3 Claims, 16 Drawing Sheets

Related U.S. Application Data division of application No. 18/091,762, filed on Dec. 30, 2022, now Pat. No. 12,028,533, which is a continuation of application No. 17/568,322, filed on Jan. 4, 2022, now Pat. No. 11,570,452, which is a continuation of application No. 16/954,026, filed as application No. PCT/KR2018/015809 on Dec. 13, 2018, now Pat. No. 11,252,420.

(60) Provisional application No. 62/599,022, filed on Dec. 15, 2017.

(56) References Cited

U.S. PATENT DOCUMENTS

| | | | | |
|---|---|---|---|---|
| 2012/0230417 A1* | 9/2012 | Sole Rojals | ......... | H04N 19/129 375/240.18 |
| 2014/0307801 A1* | 10/2014 | Ikai | ......... | H04N 19/91 375/240.18 |
| 2017/0094313 A1* | 3/2017 | Zhao | ......... | H04N 1/32181 |
| 2017/0094314 A1* | 3/2017 | Zhao | ......... | H04N 19/176 |
| 2017/0272759 A1* | 9/2017 | Seregin | ......... | H04N 19/70 |
| 2017/0280162 A1* | 9/2017 | Zhao | ......... | H04N 19/103 |
| 2017/0295380 A1* | 10/2017 | Huang | ......... | H04N 19/119 |
| 2017/0324643 A1* | 11/2017 | Seregin | ......... | H04N 19/136 |
| 2017/0339404 A1* | 11/2017 | Panusopone | ......... | H04N 19/91 |
| 2017/0339405 A1* | 11/2017 | Wang | ......... | H04N 19/593 |
| 2017/0347096 A1* | 11/2017 | Hong | ......... | H04N 19/119 |
| 2017/0347102 A1* | 11/2017 | Panusopone | ......... | H04N 19/46 |
| 2018/0077417 A1* | 3/2018 | Huang | ......... | H04N 19/70 |
| 2018/0103252 A1* | 4/2018 | Hsieh | ......... | H04N 19/176 |
| 2018/0302631 A1* | 10/2018 | Chiang | ......... | H04N 19/176 |
| 2018/0324417 A1* | 11/2018 | Karczewicz | ......... | H04N 19/159 |
| 2018/0367814 A1* | 12/2018 | Seregin | ......... | H04N 19/117 |
| 2019/0306521 A1* | 10/2019 | Zhao | ......... | H04N 19/60 |
| 2019/0313095 A1* | 10/2019 | Ikeda | ......... | H04N 19/157 |
| 2020/0021804 A1* | 1/2020 | Jun | ......... | H04N 19/46 |
| 2020/0092583 A1* | 3/2020 | Zhao | ......... | H04N 19/122 |
| 2020/0374516 A1* | 11/2020 | Heo | ......... | H04N 19/44 |
| 2021/0076076 A1* | 3/2021 | Ikai | ......... | H04N 19/60 |
| 2021/0084314 A1* | 3/2021 | Salehifar | ......... | H04N 19/61 |

* cited by examiner

IMAGE CODING METHOD ON BASIS OF SECONDARY TRANSFORM AND DEVICE THEREFOR

CROSS-REFERENCE TO RELATED APPLICATIONS

This application is a continuation of U.S. application Ser. No. 18/100,781 filed on Jan. 24, 2023, which is a division of U.S. application Ser. No. 18/091,762 filed on Dec. 30, 2022, which is continuation of U.S. application Ser. No. 17/568,322 filed on Jan. 4, 2022, which is a continuation of U.S. application Ser. No. 16/954,026 filed on Jun. 15, 2020, now U.S. Pat. No. 11,252,420, issued on Feb. 15, 2022, which is a National Stage filing under 35 U.S.C. 371 of International Application No. PCT/KR2018/015809, filed on Dec. 13, 2018, which claims the benefit of U.S. Provisional Application No. 62/599,022 filed on Dec. 15, 2017, the contents of which are all hereby incorporated by reference herein in their entirety.

BACKGROUND OF THE DISCLOSURE

Field of the Disclosure

The present disclosure relates to an image coding technology, and more particularly, to an image coding method and apparatus based on secondary transform in an image coding system.

Related Art

Demands for high-resolution and high-quality images, such as HD (High Definition) images and UHD (Ultra High Definition) images, are increasing in various fields. As image data has high resolution and high quality, the amount of information or bits to be transmitted increases relative to legacy image data. Accordingly, when image data is transmitted using a medium, such as a conventional wired/wireless broadband line, or image data is stored using an existing storage medium, a transmission cost and a storage cost thereof are increased.

Accordingly, there is a need for a highly efficient image compression technique for effectively transmitting, storing, and reproducing information of high resolution and high quality images.

SUMMARY

An object of the present disclosure is to provide a method and an apparatus for enhancing image coding efficiency.

Another object of the present disclosure is to provide a method and an apparatus for enhancing transform efficiency.

Still another object of the present disclosure is to provide a method and an apparatus for enhancing efficiency of a residual coding through transform.

Yet another object of the present disclosure is to provide an image coding method and apparatus based on secondary transform.

Still yet another object of the present disclosure is to provide a method and an apparatus for enhancing image coding efficiency based on a secondary transform index.

An exemplary embodiment of the present disclosure provides an image information decoding method performed by a decoding apparatus. The method includes: decoding a non-separable secondary transform (NSST) index from a bitstream, if an NSST is applied to a target block, decoding information about transform coefficients for the target block from the bitstream, based on the decoded NSST index, and deriving the transform coefficients for the target block based on the decoded information about the transform coefficients, in which the NSST index is decoded prior to the information about the transform coefficients for the target block.

Another exemplary embodiment of the present disclosure provides an image information encoding method performed by an encoding apparatus. The method includes: generating and encoding a non-separable secondary transform (NSST) index, if an NSST is applied to a target block, transforming coefficients for the target block, and generating and encoding information about transform coefficients for the target block, based on the NSST index, in which the NSST index is encoded prior to the information about the transform coefficients for the target block.

Still another exemplary embodiment of the present disclosure provides a decoding apparatus for decoding image information. The decoding apparatus includes: an entropy decoder which decodes a non-separable secondary transform (NSST) index from a bitstream, if an NSST is applied to a target block, decodes information about transform coefficients for the target block from the bitstream, based on the decoded NSST index, and derives the transform coefficients for the target block based on the decoded information about the transform coefficients and an inverse transformer which inversely transforms the derived transform coefficients for the target block, based on the decoded NSST index, in which the NSST index is decoded prior to the information about the transform coefficients for the target block.

Yet another exemplary embodiment of the present disclosure provides an encoding apparatus for encoding image information. The encoding apparatus includes: an entropy encoder which generates and encodes a non-separable secondary transform (NSST) index, if an NSST is applied to a target block, and generates and encodes information about transform coefficients for the target block based on the NSST index and a transformer which transforms coefficients for the target block, in which the NSST index is encoded prior to the information about the transform coefficients for the target block.

According to the present disclosure, it is possible to enhance the overall image/video compression efficiency.

According to the present disclosure, it is possible to decrease the amount of data to be transmitted for the residual processing through the efficient transform, and to enhance the residual coding efficiency.

According to the present disclosure, it is possible to concentrate the non-zero transform coefficients on the low frequency component through the secondary transform in the frequency domain.

According to the present disclosure, it is possible to perform the image coding based on the secondary transform index, thereby enhancing the image coding efficiency.

DESCRIPTION OF EXEMPLARY EMBODIMENTS

Figure 1:
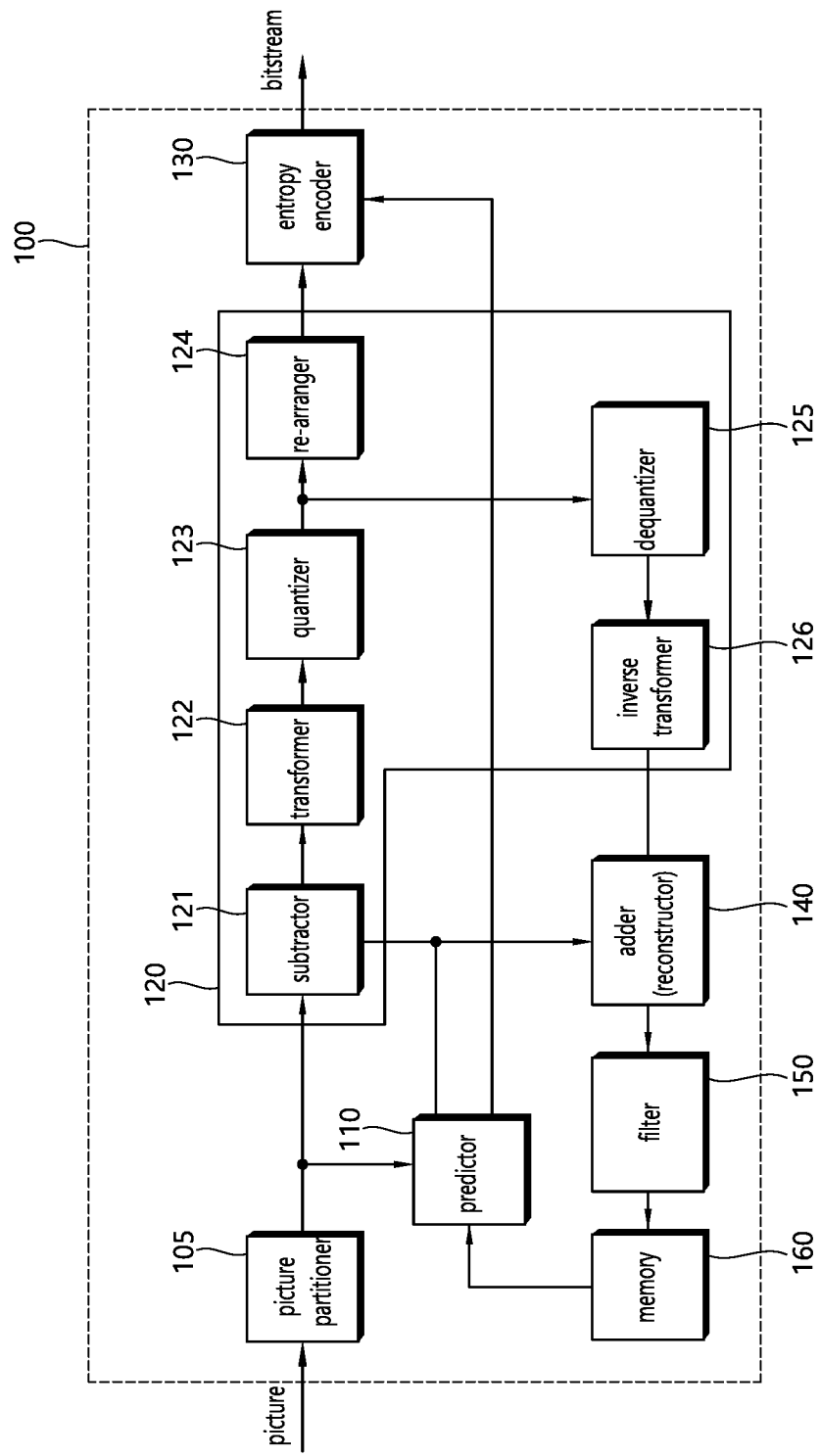
FIG. 1 is a schematic diagram illustrating a configuration of a video/image encoding apparatus to which the present disclosure is applicable.

An exemplary embodiment of the present disclosure provides an image information decoding method performed by a decoding apparatus. The method includes: decoding a non-separable secondary transform (NSST) index from a bitstream, if an NSST is applied to a target block, decoding information about transform coefficients for the target block from the bitstream, based on the decoded NSST index, and deriving the transform coefficients for the target block based on the decoded information about the transform coefficients, in which the NSST index is decoded prior to the information about the transform coefficients for the target block.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

The following description may be applied in the technical field which deals with videos, images, or images. For example, a method or an exemplary embodiment disclosed in the following description may be associated with the disclosed contents of a Versatile Video Coding (VVC) standard (ITU-T Rec. H.266), a next-generation video/image coding standard after the VVC, or standards before the VVC (for example, a High Efficiency Video Coding (HEVC) standard (ITU-T Rec. H.265) or the like).

Hereinafter, examples of the present embodiment will be described in detail with reference to the accompanying drawings. In addition, like reference numerals are used to indicate like elements throughout the drawings, and the same descriptions on the like elements will be omitted.

In the present disclosure, a video may mean a set of a series of images according to a passage of time. Generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). In addition, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information about the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video/image encoding apparatus to which the present disclosure is applicable. Hereinafter, an encoding apparatus may include a video encoding apparatus and/or an image encoding apparatus, and the video encoding apparatus may be used as a concept comprising the image encoding apparatus.

Referring to FIG. 1, a video encoding apparatus 100 may include a picture partitioner 105, a predictor 110, a residual processor 120, an entropy encoder 130, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure, a binary tree structure and/or a ternary tree structure. In this case, for example, the quad tree structure may be first applied and the binary tree structure and ternary tree structure may be applied later. Alternatively, the binary tree structure/ternary tree structure may be applied first. The coding procedure according to the present embodiment may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transform, and reconstruction, which will be described later.

In another example, the processing unit may include a coding unit (CU) prediction unit (PU), or a transformer (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units less than the smallest coding unit. Here, the final coding unit refers to a coding unit which is partitioned or split to a prediction unit or a transformer. The prediction unit is a unit which is partitioned from a coding unit, and may be a unit of sample prediction. Here, the prediction unit may be divided into sub-blocks. The transformer may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transformer may be referred to as a transform block (TB). The prediction block or prediction unit may refer to a specific area in the form of a block in a picture and include an array of prediction samples. Also, the transform block or transformer may refer to a specific area in the form of a block in a picture and include the transform coefficient or an array of residual samples.

The predictor 110 may perform prediction on a processing target block (hereinafter, it may represent a current block or a residual block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bit stream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transform based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding, according to an entropy encoding or according to a pred-configured method, together or separately on information (e.g., a syntax element value or the like) required for video reconstruction in addition to the quantized transform coefficients. The entropy-encoded information may be transmitted or stored in unit of a network abstraction layer (NAL) in a bit stream form. The bitstream may be transmitted via a network or be stored in a digital storage medium. Here, the network may include a broadcasting network or a communications network, the digital storage medium may include various storage medium such as USB, SD, CD, DVD, blue-ray, HDD, SDD and so on.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
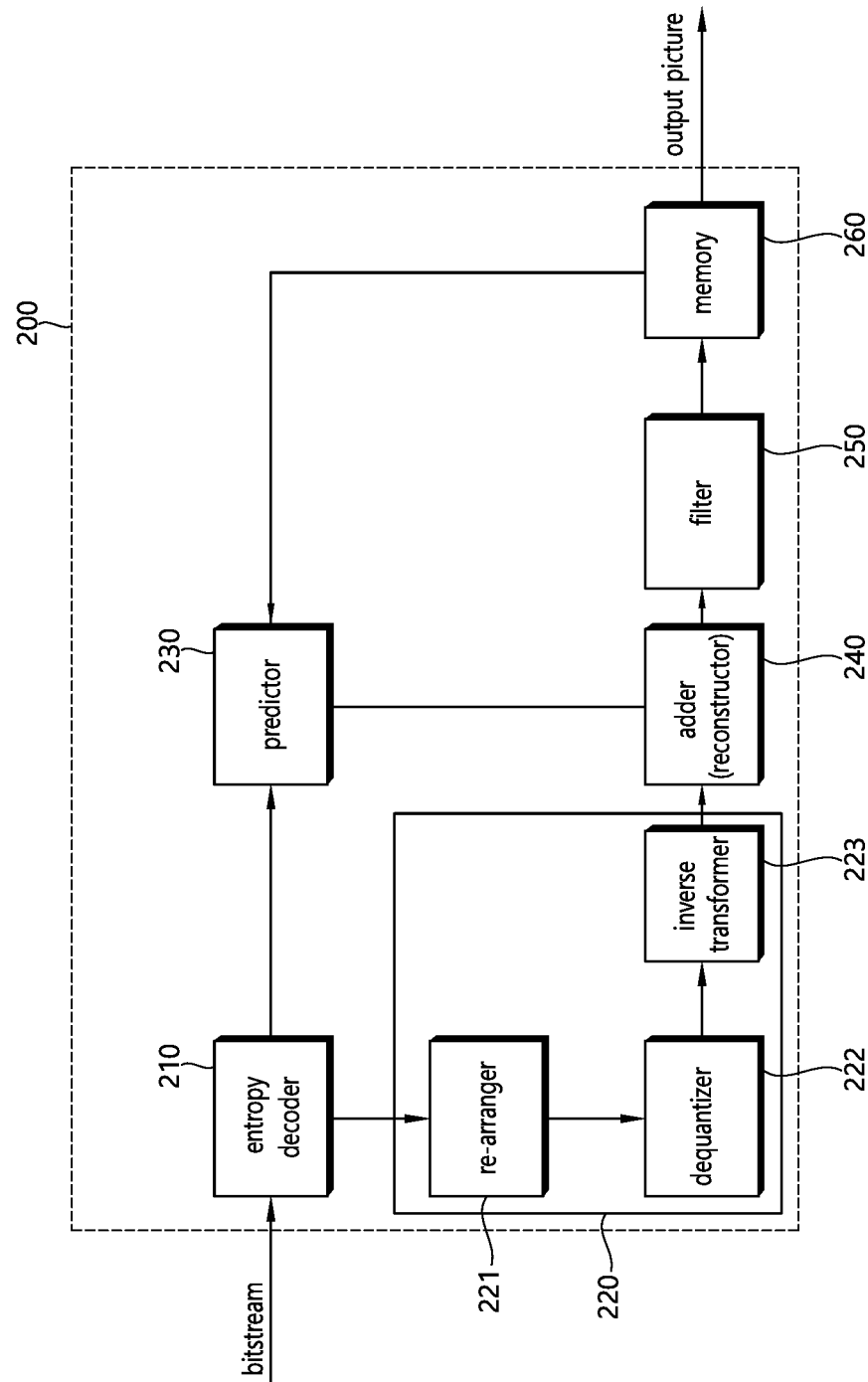
FIG. 2 is a schematic diagram illustrating a configuration of a video/image decoding apparatus to which the present disclosure is applicable.

FIG. 2 briefly illustrates a structure of a video/image decoding apparatus to which the present disclosure is applicable. Hereinafter, a video decoding apparatus may include an image decoding apparatus.

Referring to FIG. 2, a video decoding apparatus 200 may include an entropy decoder 210, a residual processor 220, a predictor 230, an adder 240, a filter 250, and a memory 260. The residual processor 220 may include a re-arranger 221, a dequantizer 222, an inverse transformer 223. In addition, although it is not depicted, the video decoding apparatus 200 may include a receiver for receiving a bitstream including video information. The receiver may be configured as a separate module or may be included in the entropy decoder 210.

When a bit stream including video/image information is input, the video decoding apparatus 200 may reconstruct a video/image/picture in association with a process by which video information is processed in the video encoding apparatus.

For example, the video decoding apparatus 200 may perform video decoding using a processing unit applied in the video encoding apparatus. Thus, the processing unit block of video decoding may be, for example, a coding unit and, in another example, a coding unit, a prediction unit or a transformer. The coding unit may be split from the largest coding unit according to the quad tree structure and/or the binary tree structure and/or ternery tree structure.

A prediction unit and a transformer may be further used in some cases, and in this case, the prediction block is a block derived or partitioned from the coding unit and may be a unit of sample prediction. Here, the prediction unit may be divided into sub-blocks. The transformer may be split from the coding unit according to the quad tree structure and may be a unit that derives a transform coefficient or a unit that derives a residual signal from the transform coefficient.

The entropy decoder 210 may parse the bit stream to output information required for video reconstruction or picture reconstruction. For example, the entropy decoder 210 may decode information in the bit stream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bit stream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding apparatus. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding apparatus.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information about a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. In addition, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding apparatus, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. In the skip mode and the merge mode, a firstly-ordered picture in the reference picture list may be used as a reference picture when motion information of a temporal neighboring block is used.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bit stream. That is, the MVD may be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter-prediction of a picture afterward, the encoding apparatus may also dequantize/inverse-transform the quantized transform coefficients to derive a residual block and generate a reconstructed picture based thereon.

Figure 3:
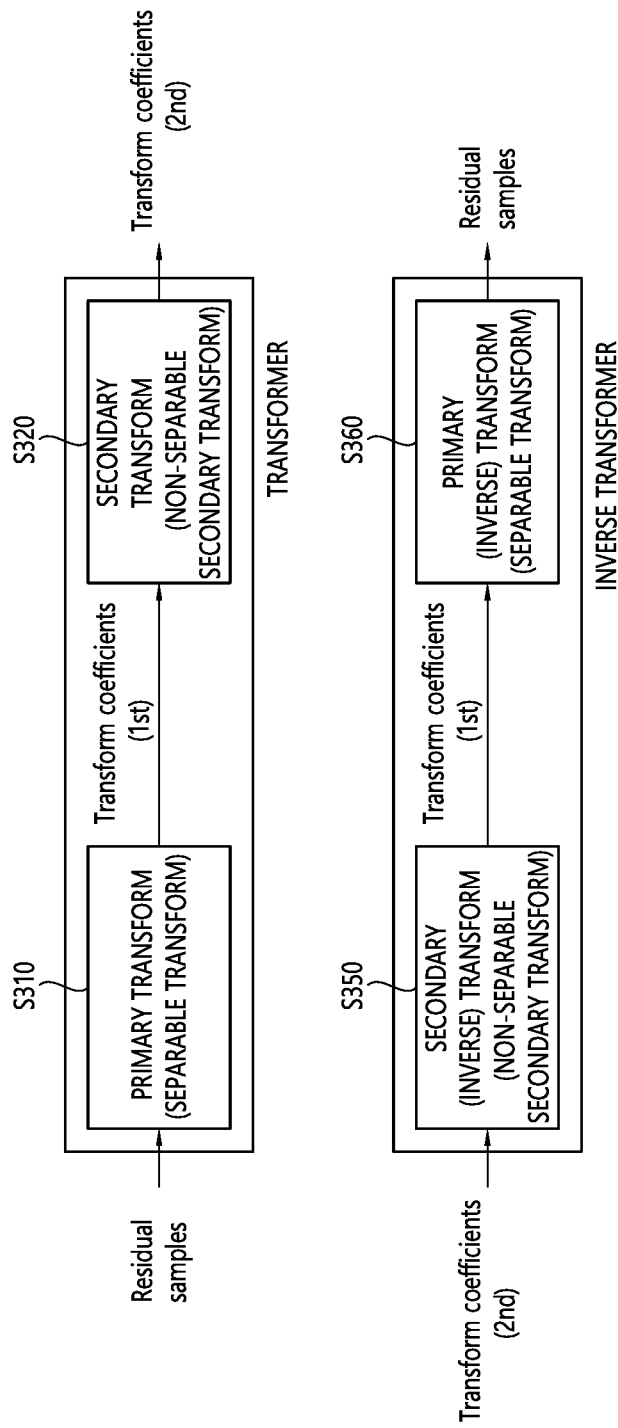
FIG. 3 is a schematic diagram illustrating a multiple transform technique according to an exemplary embodiment.

FIG. 3 schematically illustrates a multiple transform technique according to the present disclosure.

Referring to FIG. 3, a transformer may correspond to the transformer in the aforementioned encoding apparatus of FIG. 1, and an inverse transformer may correspond to the aforementioned inverse transformer in the encoding apparatus of FIG. 1 or the aforementioned inverse transformer in the decoding apparatus of FIG. 2.

The transformer may derive (primary) transform coefficients by performing a primary transform based on residual samples (residual sample array) in the residual block (S310). Here, the primary transform may include a multiple transform set (MTS). The multiple transform set may also be referred to as an adaptive multiple core transform in some cases.

The adaptive multiple core transform may represent a method for performing a transform additionally using a Discrete Cosine Transform (DCT) type 2, a Discrete Sine Transform (DST) type 7, a DCT type 8, and/or a DST type 1. That is, the multiple core transform may represent a transform method for transforming a residual signal (or a residual block) in the spatial domain into transform coefficients (or primary transform coefficients) in the frequency domain based on a plurality of transform kernels which are selected from the DCT type 2, the DST type 7, the DCT type 8, and the DST type 1. Here, the primary transform coefficients may be referred to as temporary transform coefficients from the viewpoint of the transformer.

That is, if the existing transform method is applied, the transform from the spatial domain to the frequency domain for the residual signal (or the residual block) may be applied based on the DCT type 2 to generate the transform coefficients. On the other hand, if the adaptive multiple core transform is applied, the transform from the spatial domain to the frequency domain for the residual signal (or the residual block) may be applied based on the DCT type 2, the DST type 7, the DCT type 8, and/or the DST type 1 or the like to generate the transform coefficients (or the primary transform coefficients). Here, the DCT type 2, the DST type 7, the DCT type 8, the DST type 1, and the like may be referred to as a transform type, a transform kernel, or a transform core.

For reference, the DCT/DST transform types may be defined based on basis functions, and the basis functions may be represented as shown in the following table.

TABLE 1

| Transform Type | Basis function $T_i(j)$, i, j = 0, 1, ..., N − 1 |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ where |

TABLE 1-continued

| Transform Type | Basis function $T_i(j)$, i, j = 0, 1, ..., N − 1 |
|---|---|
| DCT-V | $\omega_0 = \begin{cases} \sqrt{\dfrac{2}{N}} & i = 0 \\ 1 & i \neq 0 \end{cases}$ $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where |
| DCT-VIII | $\omega_0 = \begin{cases} \sqrt{\dfrac{2}{N}} & i = 0 \\ 1 & i \neq 0 \end{cases}, \omega_1 = \begin{cases} \sqrt{\dfrac{2}{N}} & j = 0 \\ 1 & j \neq 0 \end{cases}$ $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

If the adaptive multiple core transform is performed, a vertical transform kernel and a horizontal transform kernel for a target block among the transform kernels may be selected, and a vertical transform for the target block may be performed based on the vertical transform kernel, and a horizontal transform for the target block may be performed based on the horizontal transform kernel. Here, the horizontal transform may represent a transform for horizontal components of the target block, and the vertical transform may represent a transform for vertical components of the target block. The vertical transform kernel/the horizontal transform kernel may be adaptively determined based on a prediction mode of the target block (CU or sub-block) which encompasses the residual block and/or a transform index indicating a transform subset.

The transformer may derive (secondary) transform coefficients by performing a secondary transform based on the (primary) transform coefficients (S320). If the primary transform is the transform from the spatial domain to the frequency domain, the secondary transform may be regarded as the transform from the frequency domain to the frequency domain. The secondary transform may include a non-separable transform. In this case, the secondary transform may be referred to as a non-separable secondary transform (NSST). The non-separable secondary transform may represent the transform which generates transform coefficients (or secondary transform coefficients) for the residual signal by secondarily transforming the (primary) transform coefficients derived through the primary transform based on a non-separable transform matrix. Here, the transform may be applied at once based on the non-separable transform matrix without separately applying the vertical transform and the horizontal transform (or without independently applying the horizontal and vertical transform) to the (primary) transform coefficients. That is, the non-separable secondary transform may represent the transform method which generates the transform coefficients (or the secondary transform coefficients) by transforming the vertical component and the horizontal component of the (primary) transform coefficients together without separating them based on the non-separable transform matrix. The non-separable secondary transform may be applied to a top-left area of a block composed of the (primary) transform coefficients (hereinafter, referred to as a transform coefficient block). For example, if both the width (W) and the height (H) of the transform coefficient block are 8 or more, an 8×8 non-separable secondary transform may be applied to the top-left 8×8 area of the transform coefficient block. In addition, if both the width (W) and the height (H) of the transform coefficient block are 4 or more and the width (W) or the height (H) of the transform coefficient block is less than 8, a 4×4 non-separable secondary transform may be applied to a top-left min (8, W)×min (8, H) area of the transform coefficient block. However, an exemplary embodiment is not limited thereto, and for example, if only a condition in which the width (W) or the height (H) of the transform coefficient block is less than 8 is satisfied, the 4×4 non-separable secondary transform may also be applied to the top-left min (8, W)×min (8, H) area of the transform coefficient block.

Specifically, for example, when a 4×4 input block is used, NSST may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$ [Equation 1]

When X is expressed in a vector form, a vector $\vec{X}$ may be represented as follows.

$$\vec{X} = [X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T$$ [Equation 2]

In this case, the non-separable secondary transform may be calculated by $\vec{F} = T \cdot \vec{X}$. Where $\vec{F}$ denotes a transform coefficient vector, and T denotes a 16×16 (non-separable) transform matrix.

A 16×1 transform coefficient vector $\vec{F}$ may be re-organized as 4×4 blocks through a scan order (horizontal, vertical, diagonal, or the like). However, the aforementioned calculation is an example and hypercube-givens transform (HyGT) or the like may also be used for calculation of the non-separable secondary transform to reduce calculation complexity of the non-separable secondary transform.

Meanwhile, in the non-separable secondary transform, a transform kernel (or transform core, transform type) may be selected mode-dependently. Here, the mode may include an intra-prediction mode and/or an inter-prediction mode.

As described above, the non-separable secondary transform may be performed based on the 8×8 transform or the 4×4 transform determined based on the width (W) and height (H) of the transform coefficient block. That is, the NSST may be performed based on an 8×8 subblock size or a 4×4 subblock size. For example, in order to select the mode-based transform kernel, 35 sets of three non-separable secondary transform kernels may be configured for non-separable secondary transform for both 8×8 subblock size and 4×4 subblock size. That is, 35 transform sets may be configured for the 8×8 sub-block size, and 35 transform sets may be configured for the 4×4 sub-block size. In this case, the 35 transform sets for the 8×8 subblock size may include 3 8×8 transform kernels, respectively, and in this case, the 35 transform sets for the 4×4 subblock size may include 3 4×4 transform kernels. However, the size of the transform sub-block, the number of sets, and the number of transform kernels in the set are an example and a size other than 8×8 or 4×4 may be used, or n sets may be configured and k transform kernels may be included in each set.

The transform set may also be referred to as a NSST set, and the transform kernel in the NSST set may be referred to as a NSST kernel. Selection of a specific one of the transform sets may be performed, for example, based on an intra prediction mode of a target block (CU or subblock).

For a reference, for example, the intra prediction mode may include two non-directional or non-angular intra prediction modes and 65 directional or angular intra-prediction modes. The non-directional intra prediction modes may include a planar intra prediction mode #0 and a DC intra prediction mode #1, and the directional intra prediction modes may include 65 intra prediction modes #2 to #66. However, this is an example and the present disclosure may also be applied even when the number of intra prediction modes is different. Meanwhile, the intra prediction mode #67 may be further used in some cases, and the intra prediction mode #67 may represent a linear model (LM) mode.

In the intra prediction mode #67 according to an exemplary embodiment, an intra prediction mode having the horizontal directionality and an intra prediction mode having the vertical directionality may be classified with respect to the intra prediction mode #34 having a top-left diagonal prediction direction. The intra prediction modes #2 to #33 have the horizontal directionality, and the intra prediction modes #34 to #66 have the vertical directionality. The intra prediction mode #18 and the intra prediction mode #50 represent a horizontal intra prediction mode and a vertical intra prediction mode, respectively, and the intra prediction mode #2 may be referred to as a left downward diagonal intra prediction mode, the intra prediction mode #34 may be referred to as a top-left diagonal intra prediction mode, and the intra prediction mode #66 may be referred to as a top-right diagonal intra prediction mode.

In this case, mapping between the 35 transform sets and the intra prediction modes may be represented, for example, as shown in the following table. For reference, when the LM mode is applied to a target block, the secondary transform may not be applied to the target block.

TABLE 2

| intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 |
| intra mode | 34 | 35 | 36 | 37 | 38 | 39 | 40 | 41 | 42 | 43 | 44 | 45 | 45 | 47 | 48 | 49 | 50 |

TABLE 2-continued

| set | 34 | 33 | 32 | 31 | 30 | 29 | 28 | 27 | 26 | 25 | 24 | 23 | 22 | 21 | 20 | 19 | 18 |
|---|---|---|---|---|---|---|---|---|---|---|---|---|---|---|---|---|---|
| intra mode | 17 | 18 | 19 | 20 | 21 | 22 | 23 | 24 | 25 | 26 | 27 | 28 | 29 | 30 | 31 | 32 | 33 |
| set | 17 | 18 | 19 | 20 | 21 | 22 | 23 | 24 | 25 | 26 | 27 | 28 | 29 | 30 | 31 | 32 | 33 |
| intra mode | 51 | 52 | 53 | 54 | 55 | 56 | 57 | 58 | 59 | 60 | 61 | 62 | 63 | 64 | 65 | 66 | 67 (LM) |
| set | 17 | 16 | 15 | 14 | 13 | 12 | 11 | 10 | 9 | 8 | 7 | 6 | 5 | 4 | 3 | 2 | NULL |

Meanwhile, when it is determined that a specific set is used, one of k transform kernels in the specific set may be selected through a NSST index. The encoding apparatus may derive a NSST index indicating a specific transform kernel based on a rate-distortion (RD) check and may signal the NSST index to the decoding apparatus. The decoding apparatus may select one of k transform kernels in the specific set based on the NSST index. For example, NSST index value 0 may indicate a first NSST kernel, NSST index value 1 may indicate a second NSST kernel, and NSST index value 2 may indicate the third NSST kernel. Alternatively, the NSST index value 0 may indicate that the first NSST is not applied to the target block, and the NSST index values 1 to 3 may indicate the three transform kernels.

Referring back to FIG. 3, the transformer may perform the NSST based on the selected transform kernels and obtain (secondary) transform coefficients. The transform coefficients may be derived as quantized transform coefficients through the quantizer as described above, and encoded and signaled to the decoding apparatus and delivered to the dequantizer/inverse-transformer in the encoding apparatus.

Meanwhile, when the secondary transform is omitted as described above, the (primary) transform coefficients, which are outputs of the primary (separable) transform, may be derived as quantized transform coefficients through the quantizer as described above and may be encoded and signaled to the decoding apparatus and delivered to the dequantizer/inverse-transformer in the encoding apparatus.

The inverse transformer may perform a series of procedures in a reverse order of the procedure performed by the transformer described above. The inverse transformer may receive (inverse-quantized) transform coefficients, perform secondary (inverse) transform to derive (primary) transform coefficients (S350), and perform primary (inverse) transform on the (primary) transform coefficients to acquire a residual block (residual samples). Here, the primary transform coefficients may be referred to as modified transform coefficients from the viewpoint of the inverse transformer. As described above, the encoding apparatus and the decoding apparatus may generate a reconstructed block based on the residual block and the predicted block and generate a reconstructed picture based on the reconstructed block.

Meanwhile, as described above, when the secondary (inverse) transform is omitted, the (dequantized) transform coefficients may be received and the primary (separable) transform may be performed thereon to acquire a residual block (residual samples). As described above, the encoding apparatus and the decoding apparatus may generate a reconstructed block based on the residual block and the predicted block and generate a reconstructed picture based on the reconstructed block.

Figure 4A:
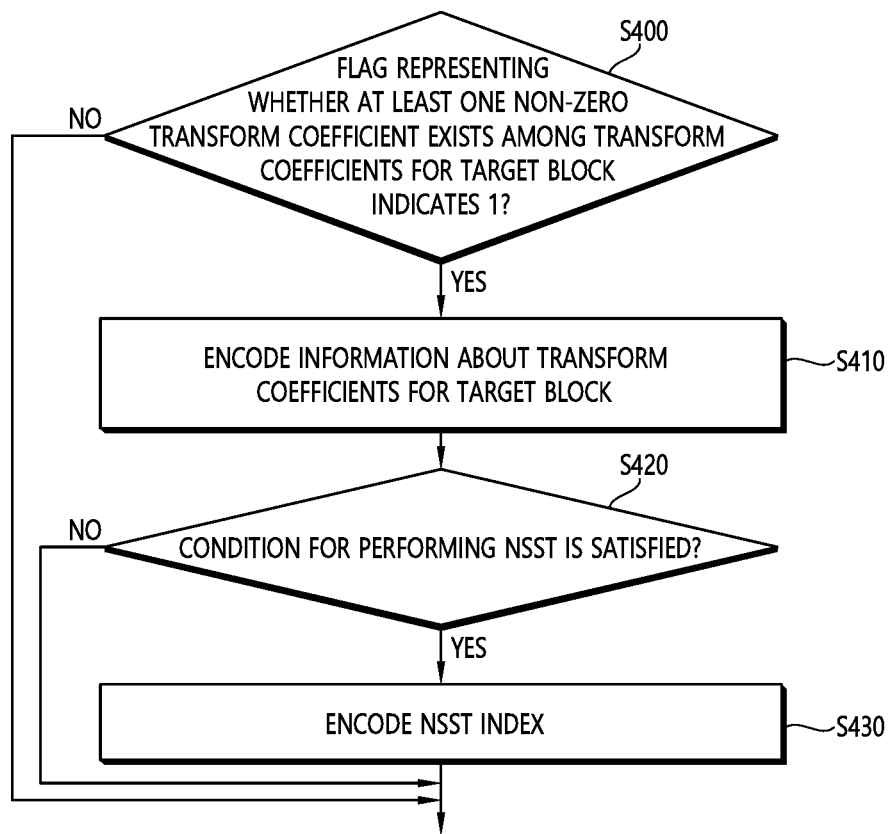
FIGS. 4A and 4B are flowcharts illustrating a coding process of transform coefficients according to an exemplary embodiment.
Figure 4B:
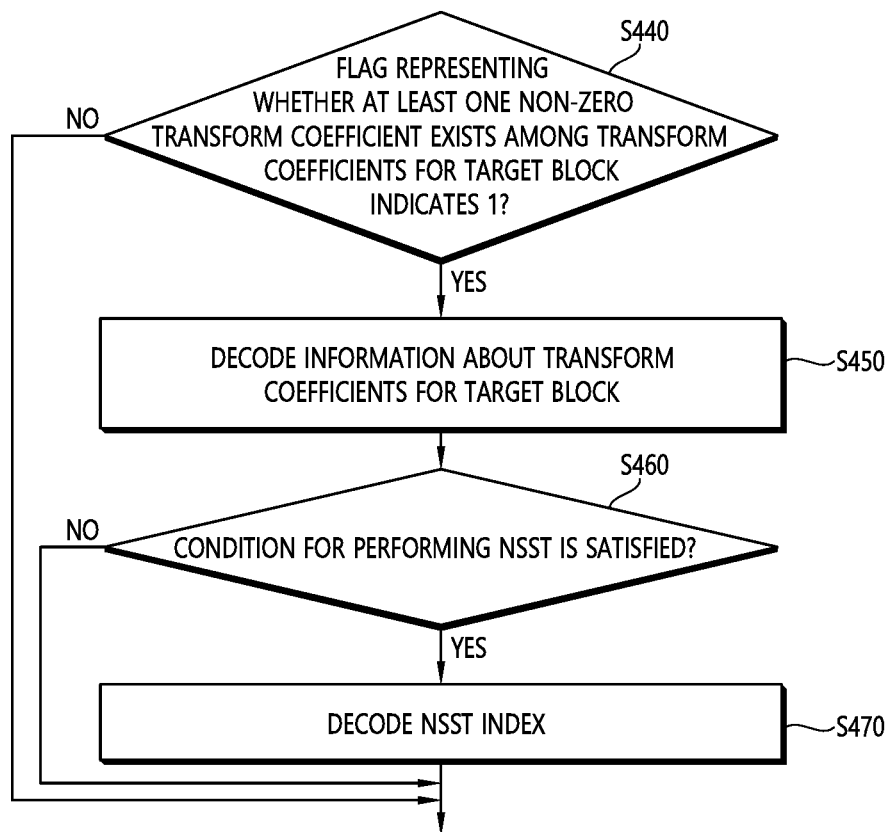

FIGS. 4A and 4B are flowcharts illustrating a coding process of transform coefficients according to an exemplary embodiment.

Each step illustrated in FIGS. 4A and 4B may be performed by the encoding apparatus 100 or the decoding apparatus 200 illustrated in FIGS. 1 and 2, and more specifically, may be performed by the entropy encoder 130 illustrated in FIG. 1 and the entropy decoder 210 illustrated in FIG. 2. Accordingly, detailed descriptions overlapping with the aforementioned contents in FIG. 1 or 2 will be omitted or simplified.

In the present specification, terms or sentences are used to define specific information or concepts. For example, in the present specification, "a flag representing whether at least one non-zero transform coefficient among transform coefficients for the target block exists" is expressed as cbf. However, since the "cbf" may be replaced with various terms such as coded_block_flag, the term or sentence used to define specific information or concepts in the present specification should not be interpreted as being limited to the name thereof in interpreting the term or sentence throughout the specification, and it is necessary to pay attention to and interpret various operations, functions, and effects according to the meaning of the term.

FIG. 4A illustrates an encoding process of transform coefficients.

The encoding apparatus 100 according to an exemplary embodiment may determine whether a flag representing whether at least one non-zero transform coefficient exists among the transform coefficients for the target block indicates 1 (S400). If the flag representing whether at least one non-zero transform coefficient exists among the transform coefficients for the target block indicates 1, at least one non-zero transform coefficient among the transform coefficients for the target block may exist. Conversely, if the flag representing whether at least one non-zero transform coefficient exists among the transform coefficients for the target block indicates 0, the transform coefficients for the target block may all indicate 0.

The flag representing whether at least one non-zero transform coefficient exists among the transform coefficients for the target block may be expressed as, for example, a cbf flag. The cbf flag may include cbf_luma[x0][y0][trafoDepth] flag for the luma block and cbf_cb[x0][y0][trafoDepth] and cbf_cr[x0][y0][trafoDepth] flags for the chroma block. Here, the array indices x0 and y0 may mean the location of the top-left luma/chroma sample of the target block with respect to the top-left luma/chroma sample of the current picture, and the array index trafoDepth may mean a level at which the coding block is divided for the purpose of transform coding. If the blocks in which the trafoDepth indicates 0 correspond to the coding block and the coding block and the transform block are defined identically, the trafoDepth may be regarded as 0.

The encoding apparatus 100 according to an exemplary embodiment may encode information about the transform coefficients for the target block, if the flag representing whether at least one non-zero transform coefficient exists among the transform coefficients for the target block indicates 1 in S400 (S410).

The information about the transform coefficients for the target block includes, for example, at least one of information about the location of the last non-zero transform coefficient, group flag information indicating whether the non-zero transform coefficient is included in a subgroup of the target block, and information about a reduced coefficient. The detailed description of each information will be described later.

The encoding apparatus 100 according to an exemplary embodiment may determine whether a condition for performing the NSST is satisfied (S420). More specifically, the encoding apparatus 100 may determine whether a condition for encoding the NSST index is satisfied. At this time, the NSST index may be referred to as a transform index, for example.

The encoding apparatus 100 according to an exemplary embodiment may encode the NSST index if it is determined that the condition for performing the NSST is satisfied in S420 (S430). More specifically, if it is determined that the condition for encoding the NSST index is satisfied, the encoding apparatus 100 may encode the NSST index.

The encoding apparatus 100 according to an exemplary embodiment may omit the operations of the S410, S420, and S430, if the flag representing whether at least one non-zero transform coefficient exists among the transform coefficients for the target block indicates 0 in S400.

In addition, the encoding apparatus 100 according to an exemplary embodiment may omit the operation of the S430, if it is determined that the condition for performing the NSST is not satisfied in S420.

FIG. 4B illustrates a decoding process of the transform coefficients.

The decoding apparatus 200 according to an exemplary embodiment may determine whether the flag representing whether at least one non-zero transform coefficient exists among the transform coefficients for the target block indicates 1 (S440). If the flag representing whether at least one non-zero transform coefficient exists among the transform coefficients for the target block indicates 1, at least one non-zero transform coefficient among the transform coefficients for the target block may exist. Conversely, if the flag representing whether at least one non-zero transform coefficient exists among the transform coefficients for the target block indicates 0, the transform coefficients for the target block may all represent 0.

The decoding apparatus 200 according to an exemplary embodiment may decode the information about the transform coefficients for the target block, if the flag representing whether at least one non-zero transform coefficient exists among the transform coefficients for the target block indicates 1 in S440 (S450).

The decoding apparatus 200 according to an exemplary embodiment may determine whether the condition for performing the NSST is satisfied (S460). More specifically, the decoding apparatus 200 may determine whether a condition for decoding the NSST index from a bitstream is satisfied.

The decoding apparatus 200 according to an exemplary embodiment may decode the NSST index, if it is determined in S460 that the condition for performing the NSST is satisfied (S470).

The decoding apparatus 200 according to an exemplary embodiment may omit the operations of the S450, S460, and S470, if the flag representing whether at least one non-zero transform coefficient exists among the transform coefficients for the target block in S440 indicates 0.

In addition, the decoding apparatus 200 according to an exemplary embodiment may omit the operation of the S470, if it is determined in S460 that the condition for performing the NSST is not satisfied.

Figure 5A:
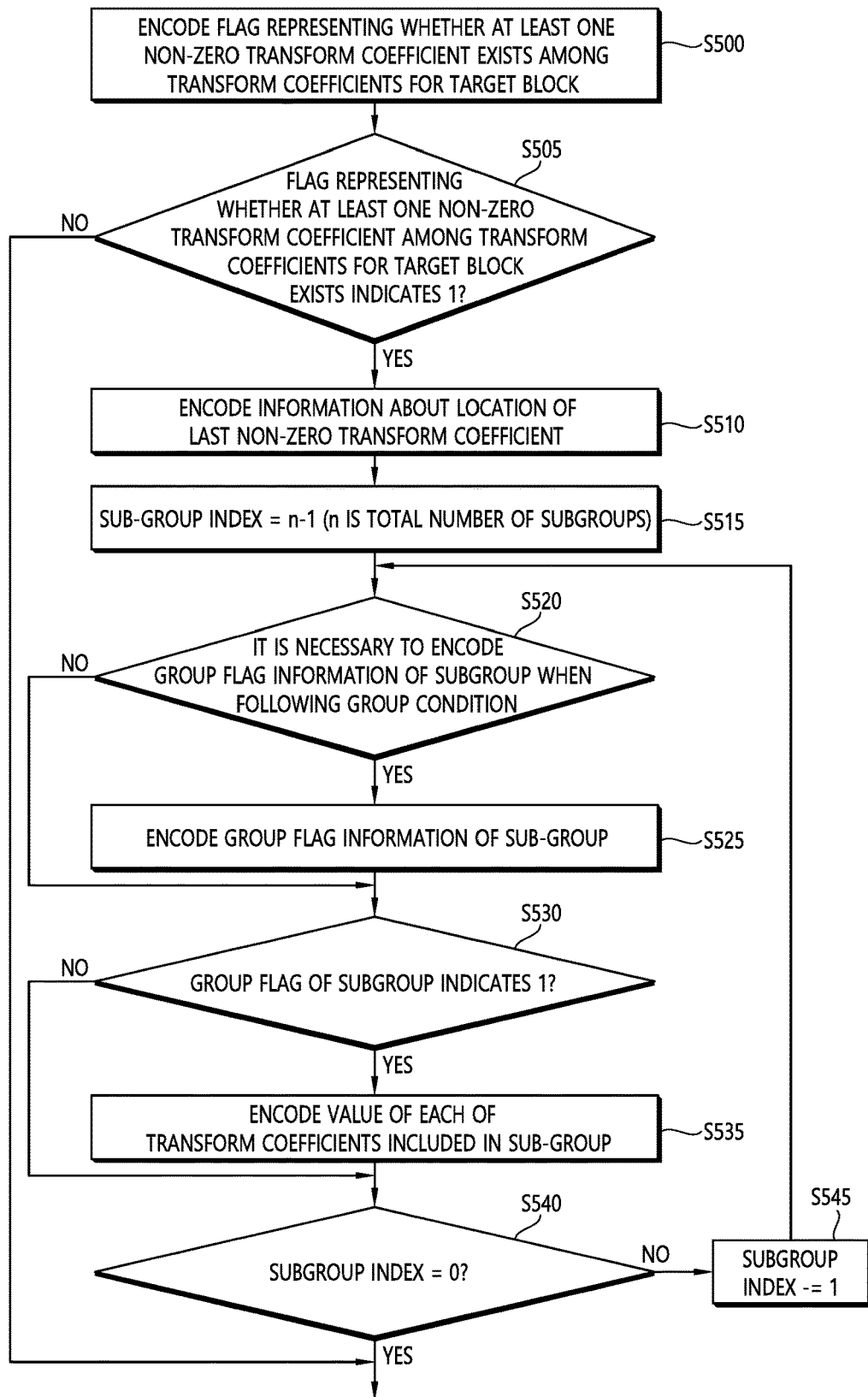
FIGS. 5A and 5B are flowcharts specifically illustrating the coding process of the transform coefficients according to an exemplary embodiment.
Figure 5B:
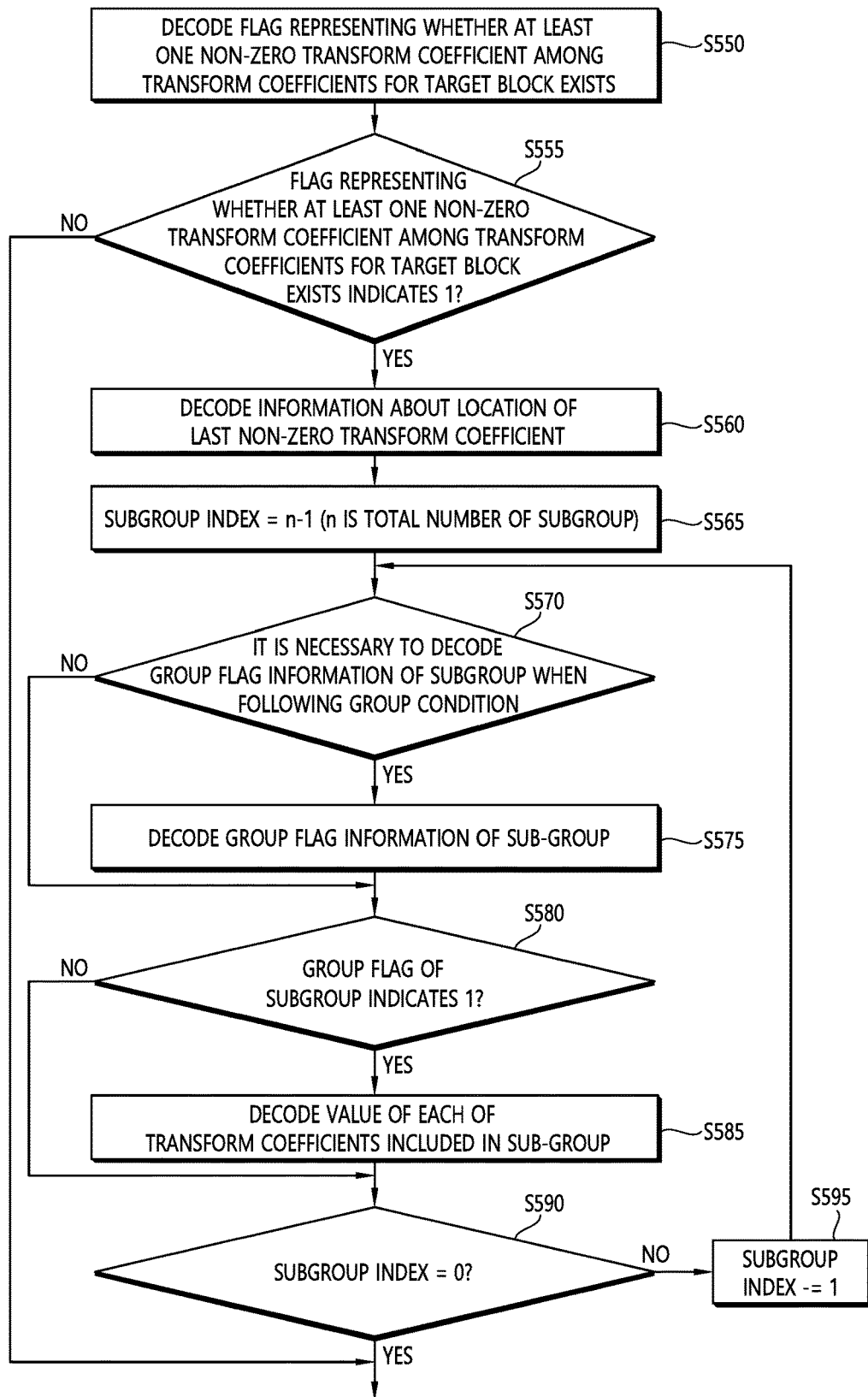

FIGS. 5A and 5B are flowcharts specifically illustrating a coding process of transform coefficients according to an exemplary embodiment.

Each step illustrated in FIGS. 5A and 5B may be performed by the encoding apparatus 100 or the decoding apparatus 200 illustrated in FIGS. 1 and 2, and more specifically, may be performed by the entropy encoder 130 illustrated in FIG. 1 and the entropy decoder 210 illustrated in FIG. 2. In addition, S505 of FIG. 5A may correspond to the S400 of FIG. 4A, and S555 of FIG. 5B may correspond to the S440 of FIG. 4B. Accordingly, detailed descriptions overlapping with the contents described above with reference to FIGS. 1, 2, 4A, and 4B will be omitted or simplified.

FIG. 5A specifically illustrates the encoding process of the transform coefficients.

The encoding apparatus 100 according to an exemplary embodiment may encode the flag representing whether at least one non-zero transform coefficient exists among the transform coefficients for the target block (S500). For example, the encoding apparatus 100 may encode the cbf flag.

The encoding apparatus 100 according to an exemplary embodiment may determine whether the flag representing whether at least one non-zero transform coefficient exists among the transform coefficients for the target block indicates 1 (S505).

The encoding apparatus 100 according to an exemplary embodiment may encode the information about the location of the last non-zero transform coefficient, if the flag representing whether at least one non-zero transform coefficient exists among the transform coefficients for the target block indicates 1 in S505 (S510).

The last non-zero transform coefficient may mean a non-zero transform coefficient which is lastly derived when the target block is scanned in a specific scanning order. That is, the last non-zero transform coefficient may be a non-zero transform coefficient which is derived for the first time when the target block is inversely scanned based on a specific scanning order. Here, the specific scanning order may include, for example, a top-right diagonal scanning order, a Z-scanning order (or a raster scanning order), and the like and is not limited thereto.

The location of the last non-zero transform coefficient may mean, for example, a coordinates (x, y) with respect to the x-axis direction location and the y-axis direction location of the last non-zero transform coefficient. The (x, y) may mean the location of the last non-zero transform coefficient of the corresponding block when the location of the top-left luma/chroma sample of the current picture is set as (0, 0).

The information about the location of the last non-zero transform coefficient may be signaled through various field names such as a last_sig_coeff_x_prefix field, a last_sig_coeff_y_prefix field, a last_sig_coeff_x_suffix field, a last_sig_coeff_y_suffix field, a last_sig_coeff_x, field, a last_sig_coeff_y field, and a last_sig_coeff_(x,y) field, and the examples are not limited thereto.

The target block according to an exemplary embodiment may include at least one subgroup. The subgroups (or the sub-blocks) included in the target block may each have the same sizes, and may have a square shape or a rectangular shape. For example, a 16×16 target block may include 16

4×4 subgroups. However, this is only an example, and for example, the sizes of the respective subgroups included in the target block may be different from each other, and the subgroups may also have a non-rectangular shape.

As an example, a subgroup index may be assigned based on the top-right diagonal scanning order. At this time, the subgroup index of the subgroup located at the top-left of the target block may be assigned as 0, and the subgroup index of the subgroup located at the bottom-right of the target block may be assigned as n−1 (where n is the total number of subgroups of the target block).

The encoding apparatus 100 according to an exemplary embodiment may first start a subgroup having a subgroup index of n−1 (S515) to perform operations of S520 to S535 with respect to all of the subgroups of the target block while decreasing the subgroup index by 1 (S545). The operations of the S520 to the S535 may be repeated until the subgroup index becomes 0 (S540).

The encoding apparatus 100 according to an exemplary embodiment may determine whether it is necessary to encode group flag information of the subgroup when following a group condition (S520). The group flag information of the subgroup may represent whether the subgroup includes the non-zero transform coefficient. The group flag information may be signaled through various field names such as Group_Flag, group_flag, subgroup_flag, subblock_flag, and coded_sub_block_flag, and the examples are not limited thereto.

The encoding apparatus 100 may determine that it is necessary to encode the group flag information of the subgroup other than the first subgroup (the subgroup index 0) and the last subgroup (the subgroup index n−1, where n is the total number of subgroups of the target block) of the target block based on the group condition. The encoding apparatus 100 may determine that the group flag information of the first subgroup and the last subgroup need not be encoded according to the group condition, because the group flags of the first subgroup and the last subgroup of the target block are determined as 1.

The encoding apparatus 100 according to an exemplary embodiment may encode the group flag information of the subgroup, if it is determined in S520 that it is necessary to encode the group flag information of the subgroup (S525).

The encoding apparatus 100 according to an exemplary embodiment may omit the operation of the S525, if it is determined in S520 that it is not necessary to encode the group flag information of the subgroup. For example, the encoding apparatus 100 may omit the encoding of the group flag information of the first subgroup and the last subgroup, while regarding the group flags of the first subgroup (the subgroup index 0) and the last subgroup (the subgroup index n−1) of the target block as 1.

The encoding apparatus 100 according to an exemplary embodiment may determine whether the group flag of the subgroup indicates 1 (S530).

The encoding apparatus 100 according to an exemplary embodiment may encode a value (or level) of each of the transform coefficients included in the subgroup, if the group flag of the subgroup indicates 1 in S530 (S535).

The encoding apparatus 100 according to an exemplary embodiment may omit the operation of the S535, if the group flag of the subgroup indicates 0 in S530. More specifically, if the group flag of the subgroup indicates 0, the encoding apparatus 100 may determine the transform coefficients included in the subgroup as 0, respectively, and accordingly, the encoding for the value of each of the transform coefficients included in the subgroup may be omitted.

The encoding apparatus 100 according to an exemplary embodiment may omit the operations of the S510 to S545, if the flag representing whether at least one non-zero transform coefficient exists among the transform coefficients for the target block indicates 0 in S505.

Meanwhile, those skilled in the art will readily understand that the S510 to the S545 are detailed operations included in the S410 of FIG. 4A.

FIG. 5B specifically illustrates a decoding process of transform coefficients.

The decoding apparatus 200 according to an exemplary embodiment may decode the flag representing whether at least one non-zero transform coefficient exists among the transform coefficients for the target block (S550). For example, the decoding apparatus 200 may decode the cbf flag.

The decoding apparatus 200 according to an exemplary embodiment may determine whether the flag representing whether at least one non-zero transform coefficient exists among the transform coefficients for the target block indicates 1 (S555).

The decoding apparatus 200 according to an exemplary embodiment may decode the information about the location of the last non-zero transform coefficient, if the flag representing whether at least one non-zero transform coefficient exists among the transform coefficients for the target block indicates 1 in the S555 (S560).

The decoding apparatus 200 according to an exemplary embodiment may first start a subgroup in which the subgroup index is n−1 (where n is the total number of subgroups of the target block) (S565) to perform the operations of S570 to S585 with respect to all of the subgroups of the target block, while decreasing the subgroup index by 1 (S595). The operations of the S570 to the S585 may be repeated until the subgroup index becomes 0 (S590).

The decoding apparatus 200 according to an exemplary embodiment may determine whether it is necessary to decode the group flag of the subgroup (S570).

The decoding apparatus 200 may determine that it is necessary to decode the group flag information of the subgroup other than the first subgroup (the subgroup index 0) and the last subgroup (the subgroup index n−1, where n is the total number of subgroups of the target block) of the target block based on the group condition. The decoding apparatus 200 may determine that it is not necessary to decode the group flag information of the first subgroup and the last subgroup according to the group condition, because the group flags of the first subgroup and the last subgroup of the target block are determined as 1.

The decoding apparatus 200 according to an exemplary embodiment may decode the group flag of the subgroup, if it is determined in the S570 that it is necessary to decode the group flag of the subgroup (S575).

The decoding apparatus 200 according to an exemplary embodiment may omit the operation of the S575, if it is determined in the S570 that it is not necessary to decode the group flag of the subgroup. For example, the decoding apparatus 200 may omit the decoding of the group flag information of the first subgroup and the last subgroup, while regarding the group flags of the first subgroup (the subgroup index 0) and the last subgroup (the subgroup index n−1) of the target block as 1.

The decoding apparatus 200 according to an exemplary embodiment may determine whether the group flag of the subgroup indicates 1 (S580).

The decoding apparatus 200 according to an exemplary embodiment may decode a value (or level) of each of the transform coefficients included in the subgroup, if the group flag of the subgroup indicates 1 in the S575 (S585).

The decoding apparatus 200 according to an exemplary embodiment may omit the operation of the S585, if the group flag of the subgroup indicates 0 in the S580. More specifically, if the group flag of the subgroup indicates 0, the decoding apparatus 200 may determine the transform coefficients included in the subgroup as 0, respectively, and accordingly, omit the decoding for the value of each of the transform coefficients included in the subgroup.

The decoding apparatus 200 according to an exemplary embodiment may omit the operations of the S560 to the S595, if the flag representing whether at least one non-zero transform coefficient exists among the transform coefficients for the target block indicates 0 in the S555.

Meanwhile, those skilled in the art will readily understand that the S560 to the S595 are detailed operations included in the S450 of FIG. 4B.

Figure 6A:
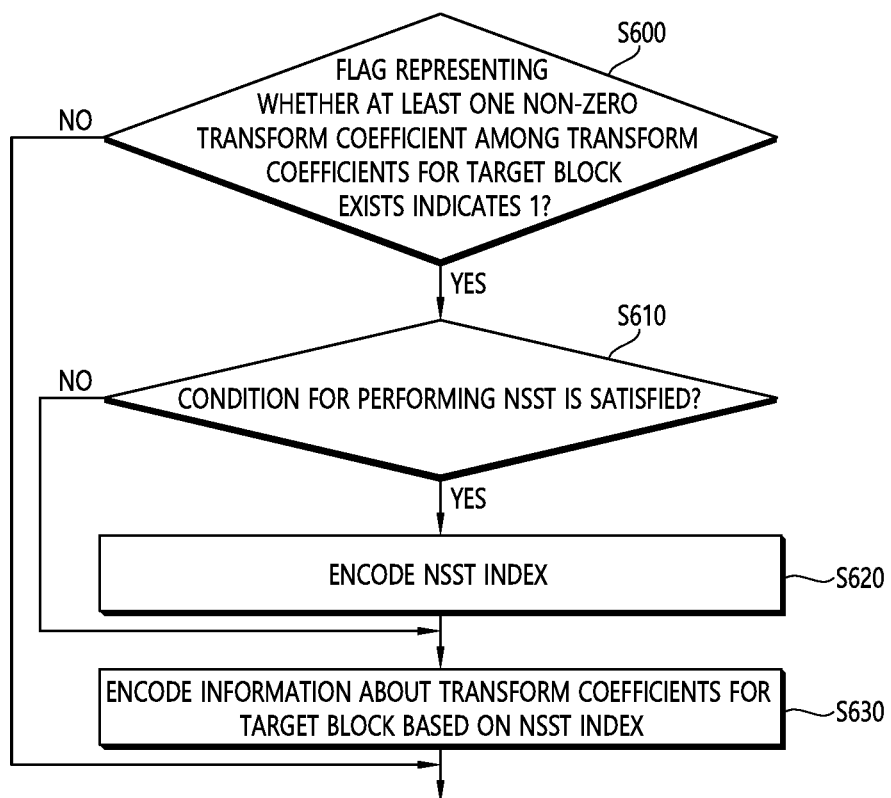
FIGS. 6A and 6B are flowcharts illustrating the coding process of the transform coefficients according to an exemplary embodiment of the present disclosure.
Figure 6B:
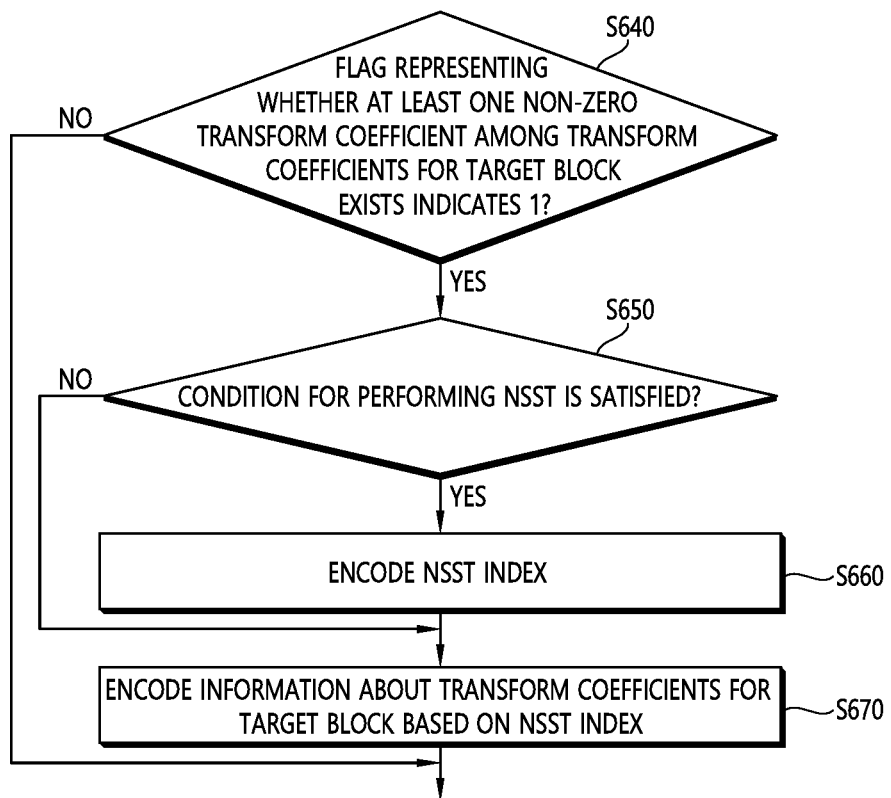

FIGS. 6A and 6B are flowcharts illustrating a process of coding transform coefficients according to an exemplary embodiment of the present disclosure.

Each step illustrated in FIGS. 6A and 6B may be performed by the encoding apparatus 100 or the decoding apparatus 200 illustrated in FIGS. 1 and 2, and more specifically, may be performed by the entropy encoder 130 illustrated in FIG. 1 and the entropy decoder 210 illustrated in FIG. 2. In addition, S600 and S620 of FIG. 6A may correspond to the S400 and the S430 of FIG. 4A, respectively, and S640 and S660 of FIG. 6B may correspond to the S440 and the S470 of FIG. 4B. Accordingly, detailed descriptions overlapping with the contents described above with reference to FIGS. 1, 2, 4A, and 4B will be omitted or simplified.

FIG. 6A illustrates an encoding process of transform coefficients according to an exemplary embodiment of the present disclosure.

The encoding apparatus 100 according to an exemplary embodiment may determine whether the flag representing whether at least one non-zero transform coefficient exists among the transform coefficients for the target block indicates 1 (S600).

The encoding apparatus 100 according to an exemplary embodiment may determine whether the condition for performing the NSST is satisfied, if the flag representing whether at least one non-zero transform coefficient among the transform coefficients for the target block exists indicates 1 in the S600 (S610). More specifically, if the flag representing whether at least one non-zero transform coefficient among the transform coefficients for the target block exists indicates 1 in the S600, the encoding apparatus 100 may determine whether the condition for performing the NSST index is satisfied.

The encoding apparatus 100 according to an exemplary embodiment may encode the NSST index, if it is determined that the condition for performing the NSST is satisfied in the S610 (S620). More specifically, if it is determined that the condition for encoding the NSST index is satisfied, the encoding apparatus 100 may encode the NSST index.

The encoding apparatus 100 according to an exemplary embodiment may omit the operation of the S620, if it is determined in the S610 that the condition for performing the NSST is not satisfied.

The encoding apparatus 100 according to an exemplary embodiment may omit the operations of the S610 and S620, if the flag representing whether at least one non-zero transform coefficient exists among the transform coefficients for the target block indicates 0 in the S600.

The encoding apparatus 100 according to an exemplary embodiment may encode the information about the transform coefficients for the target block (S630). The encoding of the information about the transform coefficients for the target block may include, for example, the encoding of the information about the location of the last non-zero transform coefficient, the encoding of the group flag information of the subgroup, the encoding of the value of each of the transform coefficients included in the subgroup, and the like, and is not limited thereto. A more detailed description for the encoding of the information about the transform coefficients for the target block will be described later with reference to FIGS. 7A, 8, and 9A.

FIG. 6B illustrates a decoding process of transform coefficients according to an exemplary embodiment of the present disclosure.

The decoding apparatus 200 according to an exemplary embodiment may determine whether the flag representing whether at least one non-zero transform coefficient exists among the transform coefficients for the target block indicates 1 (S640).

The decoding apparatus 200 according to an exemplary embodiment may determine whether the condition for performing the NSST is satisfied, if the flag representing whether at least one non-zero transform coefficient exists among the transform coefficients for the target block indicates 1 in the S640 (S650). More specifically, if the flag representing whether at least one non-zero transform coefficient exists among the transform coefficients for the target block indicates 1 in the S640, the decoding apparatus 200 may determine whether the condition for decoding the NSST index is satisfied.

The decoding apparatus 200 according to an exemplary embodiment may decode the NSST index, if it is determined that the condition for performing the NSST is satisfied in the S650 (S660). More specifically, if it is determined that the condition for decoding the NSST index is satisfied, the decoding apparatus 200 may decode the NSST index.

In an exemplary embodiment, if the condition for decoding the NSST index is satisfied (that is, if the NSST index may be used to code the transform coefficients), the NSST index may be used to estimate the probability of respective binarized bins of each syntax element to be described later.

As an example, the information about the location of the last non-zero transform coefficient may be encoded depending on the NSST index. For example, a binarization process of the last_sig_coeff_x field and the last_sig_coeff_y field and a context model may depend on the NSST index.

As another example, a context model for a significance map may depend on the NSST index. Here, the significance map may include information about valid coefficients among the transform coefficients for the target block.

As still another example, a context model for a Greater_than_one map may depend on the NSST index. Here, the Greater_than_one map may include information about transform coefficients whose absolute value is greater than 1 among valid transform coefficients for the target block.

As yet another example, a context model for a Parity_map (or Parity_flag) may depend on the NSST index. Here, the Parity_map may include information about whether the corresponding transform coefficient is an even number or an odd number with respect to a case where the absolute value is 2 or more among the valid transform coefficients for the target block. For example, a case where the Parity_flag is 0 may represent a case where the corresponding transform coefficient is 2 or more and an even number, and a case where the Parity_flag is 1 may represent a case where the corresponding transform coefficient is 2 or more and an odd number. The parity_flag may exist only when the Greater_than_one flag is 1 with respect to the corresponding transform coefficient.

As still yet another example, a context model for a Greater_than_two map may depend on the NSST index. Here, the Greater_than_two map may include information about transform coefficients whose absolute value is 2 or more among the valid transform coefficients for the target block. In a further example, the update of a rice-parameter for transform coefficient level coding may depend on the NSST index.

Meanwhile, the aforementioned last_sig_coeff_x, last_sig_coeff_y, Greater_than_one map (Greater_than_one_flag), Greater_than_two map (Greater_than_two_flag), rice-parameter, and the like are only one example of the syntax elements which may be signaled in the residual coding process, and thus it will be easily understood by those skilled in the art that the names or definitions thereof may be changed slightly case by case.

For example, the information about the last_sig_coeff_x may also be derived in consideration of both the information about the last_sig_coeff_x_prefix and the information about the last_sig_coeff_x_suffix, and the information about last_sig_coeff_y may also be derived in consideration of both the information about the last_sig_coeff_y_prefix and the information about the last_sig_coeff_y_suffix.

As another example, the Greater_than_one_map (flag), the Greater_than_two_map (flag), the rice-parameter, and the significance map (flag) are syntax elements for classifying the absolute values of the transform coefficients based on integers 0, 1, 2, and the like, and the names, definitions, signaling orders, signaling method thereof, and the like may have a slight difference case by case. The significance map (flag) may be referred to as sig_coeff_flag. The Greater_than_one_flag may be referred to as rem_abs_gt1_flag, and may represent whether the absolute value of the transform coefficient is greater than 1 or 1 or more. The Greater_than_two_flag may be referred to as rem_abs_gt2_flag, and may represent whether the absolute value of the transform coefficient is greater than 2 or 2 or more. If the rem_abs_gt1_flag indicates 1, the rem_abs_gt2_flag may be signaled. If the rem_abs_gt2_flag indicates 1, abs_remainder including information about the remaining transform coefficients not derived may be signaled. Since the main purpose of the aforementioned syntax elements is to classify the absolute values of the transform coefficients based on 0, 1, 2, and the like, those skilled in the art will readily understand that the corresponding relationship between the syntax elements such as the Greater_than_one_map (flag), the Greater_than_two_map (flag), the rice-parameter, and the significance map (flag) and the syntax elements such as the rem_abs_gt1_flag, the rem_abs_gt2_flag, the abs_remainder, and the sig_coeff_flag may be different from those described above case by case.

As still another example, the Parity_flag may be referred to as par_level_flag. The par_level_flag may be signaled only when the sig_coeff_flag indicates 1 with respect to the corresponding transform coefficient, and in some cases, may also be signaled only when the rem_abs_gt1_flag indicates 1 with respect to the corresponding transform coefficient.

The encoding apparatus 100 according to an exemplary embodiment may omit the operation of the S660, if it is determined in the S650 that the condition for performing the NSST is not satisfied.

The decoding apparatus 200 according to an exemplary embodiment may omit the operations of the S650 and S660, if the flag representing whether at least one non-zero transform coefficient exists among the transform coefficients for the target block indicates 0 in the S640.

The decoding apparatus 200 according to an exemplary embodiment may decode the information about the transform coefficients for the target block (S670). The decoding of the information about the transform coefficients for the target block may include, for example, the decoding of the information about the location of the last non-zero transform coefficient, the decoding of the group flag information of the subgroup, the decoding of the value of each of the transformation coefficients included in the subgroup, and the like, but is not limited thereto. A more detailed description of the decoding of the information about the transform coefficients for the target block will be described later with reference to FIGS. 7B, 8, and 9B.

Figure 7A:
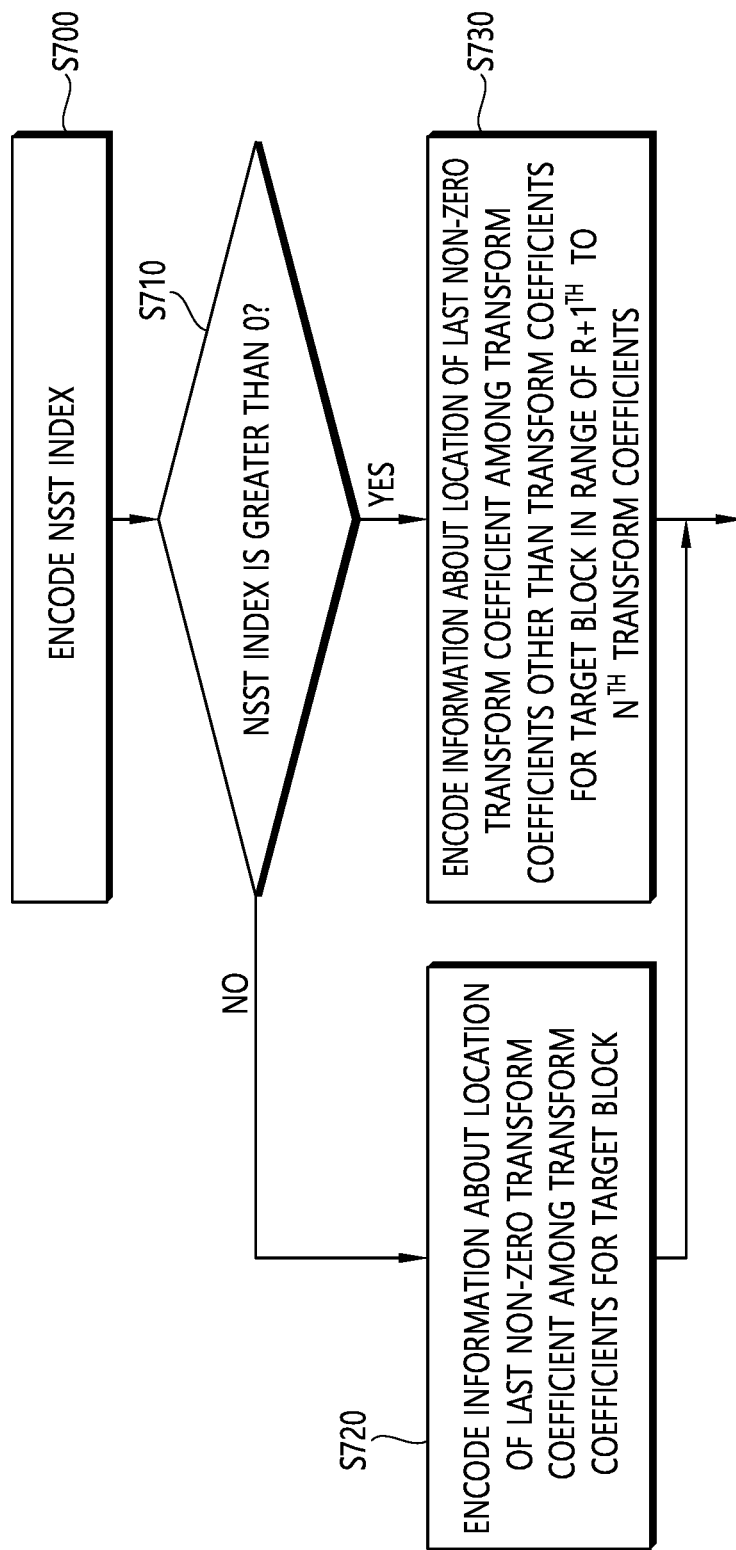
FIGS. 7A and 7B are flowcharts illustrating a coding process of transform coefficients according to another exemplary embodiment of the present disclosure.
Figure 7B:
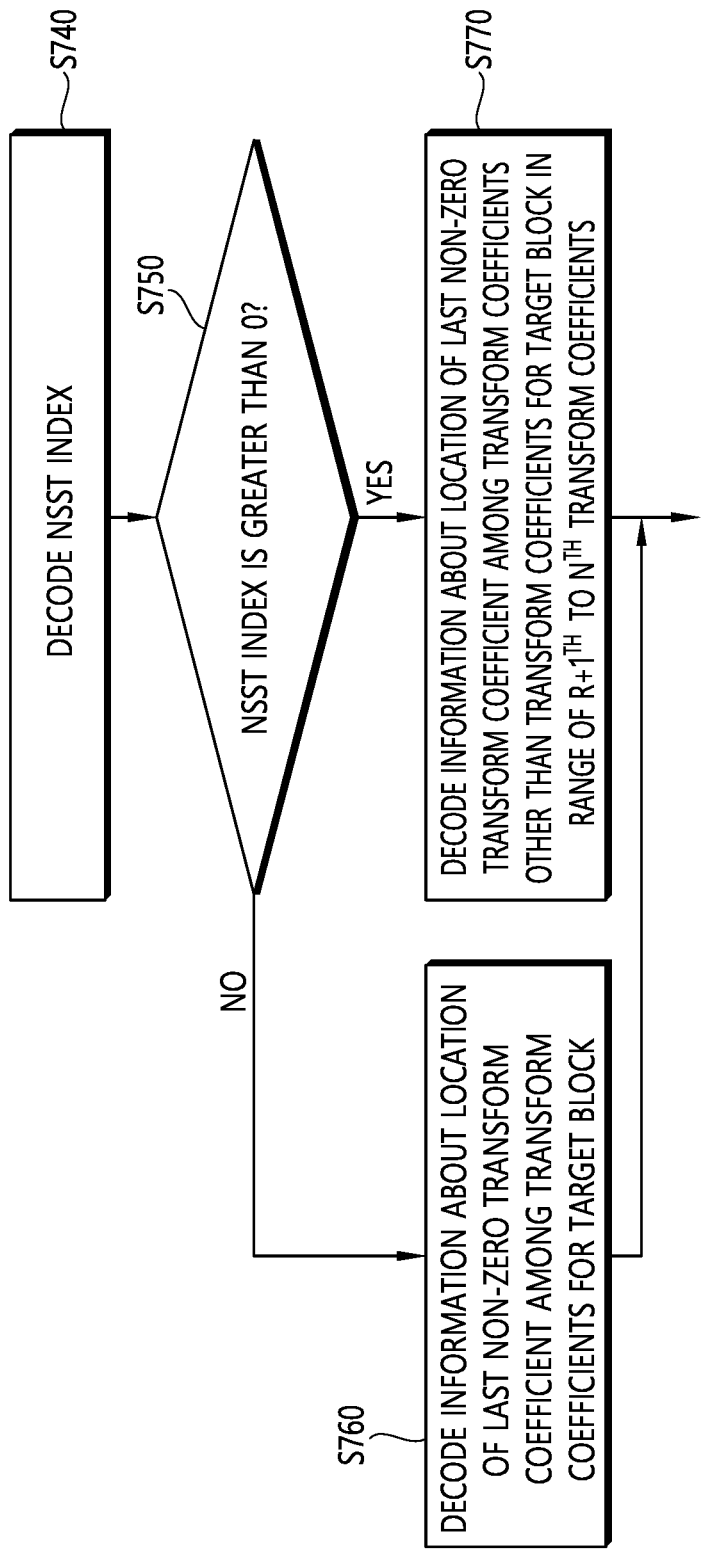

FIGS. 7A and 7B are flowcharts illustrating a coding process of transform coefficients according to another exemplary embodiment of the present disclosure.

Each step illustrated in FIGS. 7A and 7B may be performed by the encoding apparatus 100 or the decoding apparatus 200 illustrated in FIGS. 1 and 2, and more specifically, may be performed by the entropy encoder 130 illustrated in FIG. 1 and the entropy decoder 210 illustrated in FIG. 2. In addition, S700 of FIG. 7A may correspond to the S430 of FIG. 4A, and S740 of FIG. 7B may correspond to the S470 of FIG. 4B. Accordingly, detailed descriptions overlapping with the contents described above with reference to FIGS. 1, 2, 4A, and 4B will be omitted or simplified.

FIG. 7A illustrates an encoding process of transform coefficients according to another exemplary embodiment of the present disclosure.

The encoding apparatus 100 according to an exemplary embodiment may encode the NSST index (S700).

The encoding apparatus 100 according to an exemplary embodiment may determine whether the NSST index is greater than 0 (S710).

The encoding apparatus 100 according to an exemplary embodiment may encode the information about the location of the last non-zero transform coefficient among the transform coefficients for the target block, if the NSST index is not greater than 0 in the S710 (S720). More specifically, if a total of A transform coefficients for the target block exist, the encoding apparatus 100 may encode the information about the location of the last non-zero transform coefficient based on a specific scanning order among the transform coefficients in a range of first to $A^{th}$ transform coefficients which are all of the transform coefficients for the target block.

The encoding apparatus 100 according to an exemplary embodiment may encode the information about the location of the last non-zero transform coefficient among the transform coefficients other than the transform coefficients for the target block in a range of $R+1^{th}$ to $N^{th}$ transform coefficients, if the NSST index is greater than 0 in the S710 (S730).

The primary transform and the secondary transform described above with reference to FIGS. 1 to 3 may be applied based on a reduced transform. Since the NSST described with reference to FIGS. 4A to 11 is an example of the secondary transform, the NSST may also be applied based on the reduced transform. The reduced transform means a transform which decreases the amount of computation required during transform by decreasing the size of the transform matrix based on the reduced coefficient (R) when performing the transform. At this time, the reduced coefficient (R) may be signaled by being included in the information about the transform coefficient for the target block, or determined as a specific coefficient based on the size of the target block, and the exemplary embodiment is not limited thereto. The reduced transform may be variously referred to as reduced transform, reduced transform, RTS, and the like.

Generally, when the NSST is performed, the size of the transform matrix (or the matrix) used during the transform may be N×N if the square of the length of one side of the block to which the NSST is applied is N. In comparison therewith, if the NSST is applied based on the reduced transform, the size of the reduced transform matrix may be R×N (where R<N). When the reduced transform is applied, the size of the transform matrix may be decreased by an R/N ratio which is a reduced factor, thereby enhancing the transform efficiency and coding efficiency of the encoding apparatus 100.

Since R transform coefficients are derived when the NSST is applied based on the reduced transform, the number of transform coefficients may be decreased by N−R compared to the case where the N transform coefficients are derived when the NSST is applied not based on the reduced transform. At this time, the encoding apparatus 100 may regard as 0 the transform coefficients for the target block in a range of $R+1^{th}$ to $N^{th}$ transform coefficients which are not derived when the NSST is applied based on the reduced transformation, and accordingly, the encoding apparatus 100 may derive the last non-zero transform coefficient among the transform coefficients other than the transform coefficients for the target block in the range of the $R+1^{th}$ to $N^{th}$ transform coefficients in the S730.

FIG. 7B illustrates a decoding process of transform coefficients according to another exemplary embodiment of the present disclosure.

The decoding apparatus 200 according to an exemplary embodiment may decode the NSST index (S740).

The decoding apparatus 200 according to an exemplary embodiment may determine whether the NSST index is greater than 0 (S750).

The decoding apparatus 200 according to an exemplary embodiment may decode the information about the location of the last non-zero transform coefficient among the transform coefficients for the target block, if the NSST index is not greater than 0 in the S750 (S760). More specifically, if a total of A transform coefficients for the target block exist, the decoding apparatus 200 may decode the information about the location of the last non-zero transform coefficient based on the specific scanning order among the transform coefficients in the range of first to $A^{th}$ transform coefficients which are all of the transform coefficients for the target block.

The decoding apparatus 200 according to an exemplary embodiment may decode the information about the location of the last non-zero transform coefficient among the transform coefficients other than the transform coefficients for the target block in the range of the $R+1^{th}$ to $N^{th}$ transform coefficients, if the NSST index is greater than 0 in the S750 (S770).

The primary inverse transform and the secondary inverse transform described above with reference to FIGS. 1 to 3 may be applied based on a reduced inverse transform. Since the inverse NSST described with reference to FIGS. 4A to 11 is an example of the secondary inverse transform, the inverse NSST may also be applied based on the reduced inverse transform. The reduced inverse transform is an inverse transform of the reduced transform described above with reference to FIG. 7A, and a reduced inverse transform matrix may have a transpose relationship with the reduced transform matrix. The reduced inverse transform may be variously referred to as reduced inverse transform, reduced inverse transform, inverse RTS, and the like.

Since the reduced inverse transform matrix has the transpose relationship with the reduced transform matrix, the matrix size may be N×R (where R<N). When the reduced inverse transform is applied, the size of the transform matrix is decreased by the R/N ratio which is the reduced factor, thereby enhancing the transform efficiency and coding efficiency of the decoding apparatus 200.

Since R transform coefficients are required when the inverse NSST is applied based on the reduced inverse transform, the required number of transform coefficients may be decreased by N−R compared to the case where the N transform coefficients are required when the inverse NSST is applied not based on the reduced inverse transform. At this time, the decoding apparatus 200 may regard as 0 the transform coefficients for the target block in the range of the $R+1^{th}$ to $N^{th}$ transform coefficients which are not required when the inverse NSST is applied based on the reduced inverse transform, and accordingly, the decoding apparatus 200 may derive the last non-zero transform coefficient among the transform coefficients other than the transform coefficients for the target block in the range of the $R+1^{th}$ to $N^{th}$ transform coefficients in the S770.

Figure 8A:
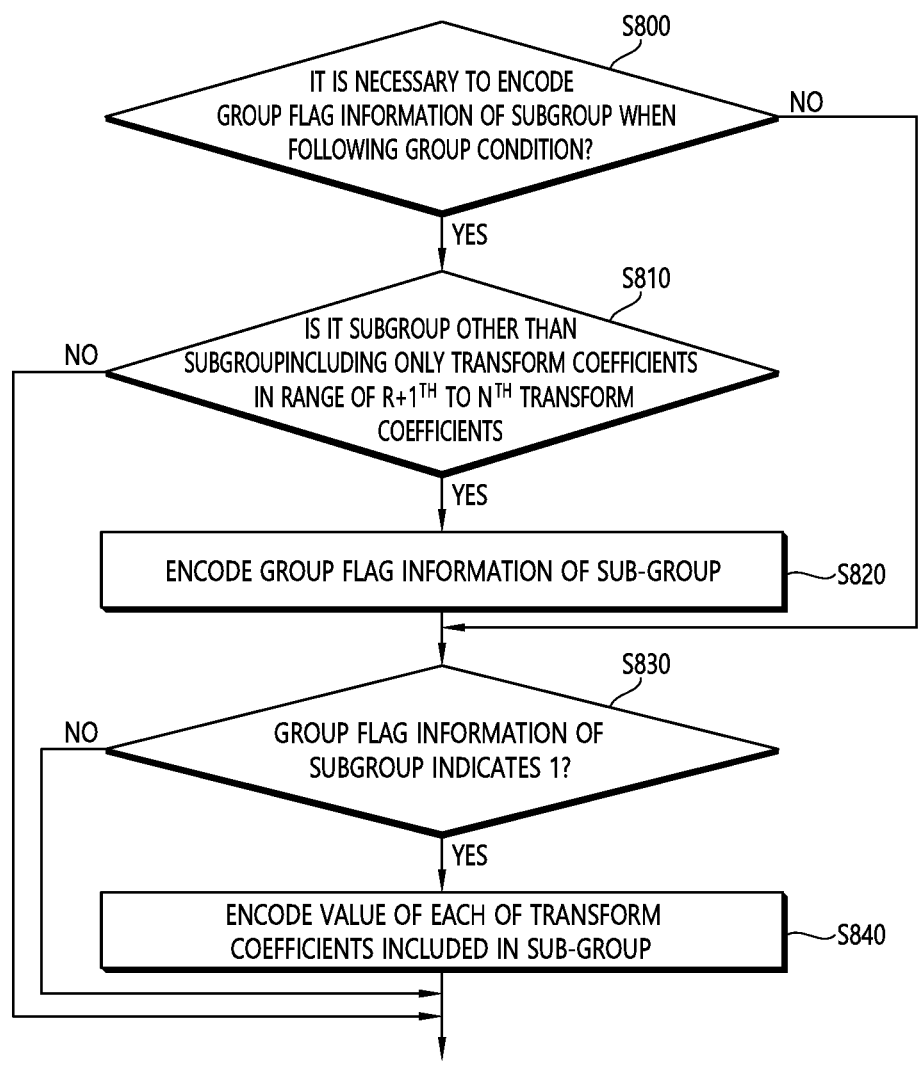
FIGS. 8A and 8B are flowcharts illustrating a coding process of transform coefficients according to still another exemplary embodiment of the present disclosure.
Figure 8B:
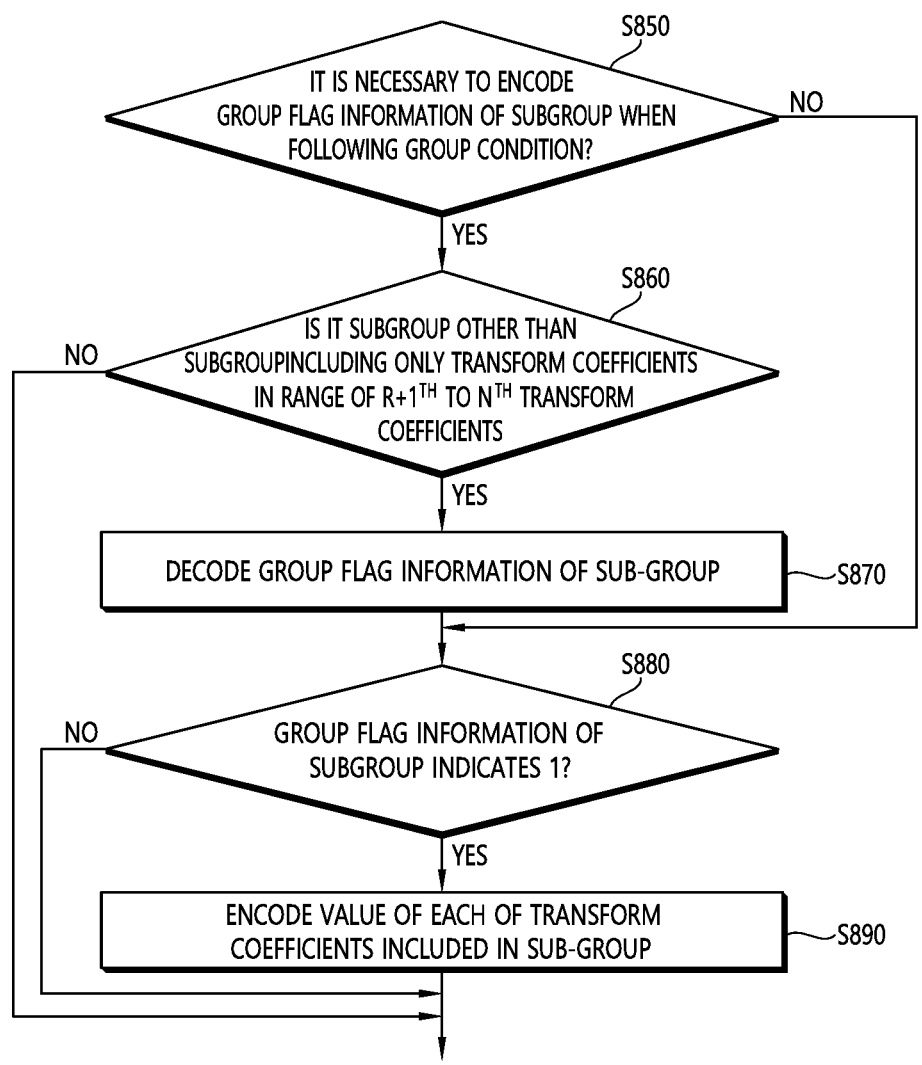

FIGS. 8A and 8B are flowcharts illustrating a coding process of transform coefficients according to still another exemplary embodiment of the present disclosure.

Each step illustrated in FIGS. 8A and 8B may be performed by the encoding apparatus 100 or the decoding apparatus 200 illustrated in FIGS. 1 and 2, and more specifically, may be performed by the entropy encoder 130 illustrated in FIG. 1 and the entropy decoder 210 illustrated in FIG. 2. Accordingly, detailed descriptions overlapping with the contents described above with reference to FIG. 1 or 2 will be omitted or simplified.

FIG. 8A illustrates an encoding process of transform coefficients according to still another exemplary embodiment.

The encoding apparatus 100 according to an exemplary embodiment may determine whether it is necessary to encode the group flag information of the subgroup according to the group condition (S800). The encoding apparatus 100 may determine that it is necessary to encode the group flag information of the subgroup other than the first subgroup (the subgroup index 0) and the last subgroup (the subgroup index n−1, where n is the total number of subgroups of the target block) for the target block based on the group condition. Since the group flags of the first subgroup and the last subgroup for the target block are determined as 1, the encoding apparatus 100 may determine that the group flag information of the first subgroup and the last subgroup need not be encoded according to the group condition.

The encoding apparatus 100 according to an exemplary embodiment may determine whether the subgroup is a subgroup other than the subgroup including only the transform coefficients in the range of the $R+1^{th}$ to $N^{th}$ transform coefficients, if it is determined that it is necessary to encode the group flag information of the subgroup according to the group condition in the S800 (S810). At this time, the NSST index may be greater than 0, and the transform coefficients in the range of the R+1$^{th}$ to N$^{th}$ transform coefficients for the target block are each determined as 0 if the NSST index is greater than 0, such that the group flag of the subgroup including only the transform coefficients in the range of the R+1$^{th}$ to N$^{th}$ transform coefficients for the target block may be determined as 0, and the encoding apparatus 100 may determine that it is not necessary to encode the group flag of the subgroup including only the transform coefficients in the range of the R+1$^{th}$ to N$^{th}$ transform coefficients in the S810.

The encoding apparatus 100 according to an exemplary embodiment may encode the group flag of the subgroup, if it is determined in the S810 that the subgroup is a subgroup other than the subgroup including only the transform coefficients in the range of the R+1$^{th}$ to N$^{th}$ transform coefficients (S820).

The encoding apparatus 100 according to an exemplary embodiment may omit the operations of the S810 and the S820, if it is determined in the S800 that it is not necessary to encode the group flag of the subgroup according to the group condition. More specifically, if the current subgroup is the first subgroup or the last subgroup, the encoding apparatus 100 may determine that it is not necessary to encode the group flag of the subgroup, and accordingly omit the operations of the S810 and the S820.

The encoding apparatus 100 according to an exemplary embodiment may determine whether the group flag of the subgroup indicates 1 (S830).

The encoding apparatus 100 according to an exemplary embodiment may encode a value (or level) of each of the transform coefficients included in the subgroup, if the group flag of the subgroup indicates 1 in the S830 (S840).

The encoding apparatus 100 according to an exemplary embodiment may omit the operation of the S840, if the group flag of the subgroup indicates 0 in the S830. More specifically, if the group flag of the subgroup indicates 0, the encoding apparatus 100 may determine the transform coefficients included in the subgroup as 0, respectively, and accordingly, omit the encoding for the value (or level) of each of the transform coefficients included in the subgroup.

The encoding apparatus 100 according to an exemplary embodiment may omit the operations of the S820, the S830, and the S840, if it is determined in the S810 that the subgroup is a subgroup including only the transform coefficients in the range of the R+1$^{th}$ to N$^{th}$ transform coefficients. More specifically, if the subgroup is a subgroup including only the transform coefficients in the range of the R+1$^{th}$ to N$^{th}$ transform coefficients, the encoding apparatus 100 may determine that it is not necessary to encode the group flag of the subgroup, and accordingly, omit the operations of the S820, the S830, and the S840.

When considering the S800 and the S810, the group flag information corresponding to the subgroup other than the first subgroup, the last subgroup, and the subgroup including only the transform coefficients for the target block in the range of the R+1$^{th}$ to N$^{th}$ transform coefficients among at least one subgroup for the target block may be encoded.

FIG. 8B illustrates a decoding process of transform coefficients according to still another exemplary embodiment.

The decoding apparatus 200 according to an exemplary embodiment may determine whether it is necessary to decode the group flag of the subgroup according to the group condition (S850). The decoding apparatus 200 may determine that it is necessary to decode the group flag information of the subgroup other than the first subgroup (the subgroup index 0) and the last subgroup (the subgroup index n−1, where n is the total number of subgroups of the target block) for the target block based on the group condition. Since the group flags of the first subgroup and the last subgroup for the target block are determined as 1, the decoding apparatus 200 may determine that it is not necessary to decode the group flag information of the first subgroup and the last subgroup according to the group condition.

The decoding apparatus 200 according to an exemplary embodiment may determine whether the subgroup is a subgroup other than the subgroup including only the transform coefficients in the range of the R+1$^{th}$ to N$^{th}$ transform coefficients, if it is determined that it is necessary to decode (or parse) the group flag of the subgroup (from a bitstream) according to the group condition in the S850 (S860). At this time, the NSST index may be greater than 0, and the transform coefficients in the range of the R+1$^{th}$ to N$^{th}$ transform coefficients for the target block are determined as 0, respectively if the NSST index is greater than 0, such that the group flag of the subgroup including only the transform coefficients in the range of the R+1$^{th}$ to N$^{th}$ transform coefficients for the target block may be determined as 0, and the decoding apparatus 200 may determine that it is not necessary to decode (or parse) the group flag of the subgroup including only the transform coefficients in the range of the R+1$^{th}$ to N$^{th}$ transform coefficients (from the bitstream) in the S860.

The decoding apparatus 200 according to an exemplary embodiment may decode (or parse) the group flag of the subgroup (from the bitstream), if it is determined that the subgroup is a subgroup other than the subgroup including only the transform coefficients in the range of the R+1$^{th}$ to N$^{th}$ transform coefficients in the S860 (S870).

The decoding apparatus 200 according to an exemplary embodiment may omit the operations of the S860 and the S870, if it is determined in the S850 that it is not necessary to decode the group flag of the subgroup according to the group condition. More specifically, if the current subgroup is the first subgroup or the last subgroup, the decoding apparatus 200 may determine that it is not necessary to decode the group flag of the subgroup, and accordingly, omit the operations of the S860 and the S870.

The decoding apparatus 200 according to an exemplary embodiment may determine whether the group flag of the subgroup indicates 1 (S880).

The decoding apparatus 200 according to an exemplary embodiment may decode the value (or level) of each of the transform coefficients included in the subgroup, if the group flag of the subgroup indicates 1 in the S880 (S890).

The decoding apparatus 200 according to an exemplary embodiment may omit the operation of the S890, if the group flag of the subgroup indicates 0 in the S880. More specifically, if the group flag of the subgroup indicates 0, the decoding apparatus 200 may determine the transform coefficients included in the subgroup as 0, respectively, and accordingly, omit the decoding for the value (or level) of each of the transform coefficients included in the subgroup.

The decoding apparatus 200 according to an exemplary embodiment may omit the operations of the S870, the S880, and the S890, if it is determined in the S860 that the subgroup is a subgroup including only the transform coefficients in the range of the R+1$^{th}$ to N$^{th}$ transform coefficients. More specifically, if the subgroup is a subgroup including only the transform coefficients in the range of the R+1$^{th}$ to N$^{th}$ transform coefficients, the decoding apparatus 200 may determine that it is not necessary to decode the group flag of the subgroup, and accordingly, omit the operations of the S870, the S880, and the S890.

Figure 9:
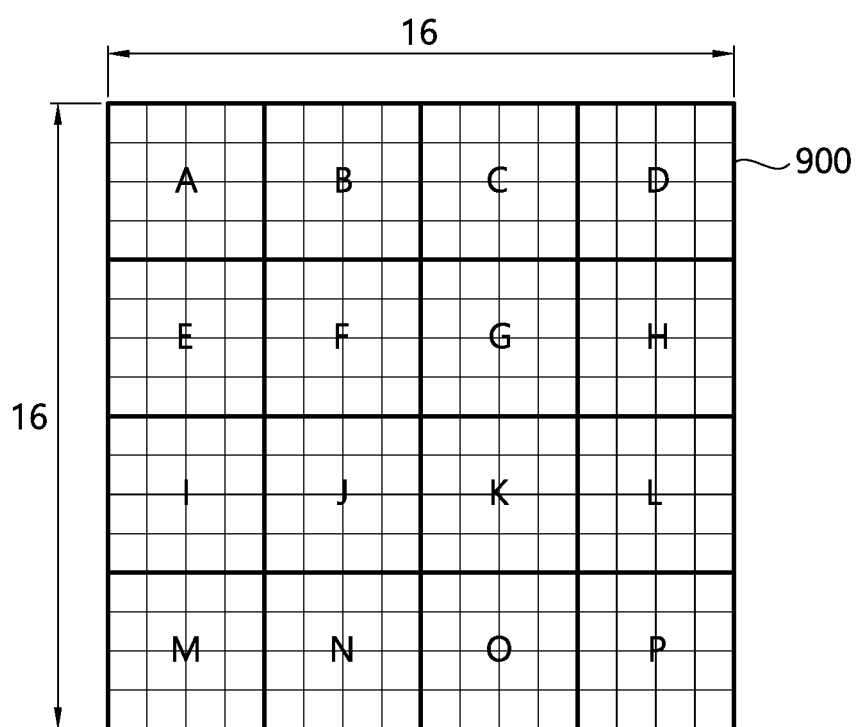
FIG. 9 is a diagram illustrating the arrangement of transform coefficients based on a target block according to an exemplary embodiment of the present disclosure.

FIG. 9 is a diagram for explaining an arrangement of transform coefficients based on a target block according to an exemplary embodiment of the present disclosure. Hereinafter, descriptions about transform described below with reference to FIG. 9 may also be applied to the inverse transform in the same manner.

For the target block (or the residual block) 900, the primary transform and the NSST (an example of the secondary transform) may be performed. At this time, a first exemplary embodiment may perform the NSST based on the reduced transform, and a second exemplary embodiment may also perform the NSST not based on the reduced transform.

In the first exemplary embodiment, the NSST not based on the reduced transform in addition to the primary transform may be performed for the target block 900. As an example, a 16×16 block illustrated in FIG. 9 represents the target block 900, and 4×4 blocks indicated by A to P may represent subgroups of the target block 900. The primary transform may be performed in the entire range of the target block 900, and after the primary transform is performed, the NSST may be applied to 8×8 blocks configured by subgroups A, B, E, and F. If the primary transform and the NSST are performed sequentially, the N (where N means the square of the length of one side of the block to which the NSST is applied, and thus may become 64 which is the square of 8 in the present example) NSST transform coefficients derived by performing the NSST may be assigned to the respective blocks included in the subgroups A, B, E, and F, and the primary transform coefficients for which the NSST is not performed may be assigned to the respective blocks included in subgroups C, D, G, H, I, J, K, L, M, N, O and P.

In the second exemplary embodiment, the NSST based on the reduced transform in addition to the primary transform may be performed for the target block 900. As an example, the 16×16 block illustrated in FIG. 9 represents the target block 900, and the 4×4 blocks indicated by A to P may represent the subgroups of the target block 900. The primary transform may be performed in the entire range of the target block 900, and after the primary transform is performed, the NSST may be applied to 8×8 blocks configured by the subgroups A, B, E, and F. At this time, if the NSST based on the reduced transform is performed, only R (where R means a reduced coefficient, and R is smaller than N) NSST transform coefficients are derived, such that the NSST transform coefficients in the range of the R+1$^{th}$ to N$^{th}$ transform coefficients may be each determined as 0. If R is, for example, 16, the 16 transform coefficients derived by performing the NSST based on the reduced transform may be assigned to the respective blocks included in the subgroup A, which is the top-left 4×4 block of the target block 900, and the transform coefficient 0 may be assigned to N-R respective blocks, that is, 64−16=48, included in the subgroups B, E, and F. The primary transform coefficients for which the NSST based on the reduced transform is not performed may be assigned to the respective blocks included in the subgroups C, D, G, H, I, J, K, L, M, N, O, and P.

In the aforementioned second exemplary embodiment, since the R+1$^{th}$ to N$^{th}$ NSST transform coefficients of the target block 900 are each determined as 0, the last non-zero transform coefficient of the target block 900 may be derived among the transform coefficients other than the R+1$^{th}$ to N$^{th}$ transform coefficients. That is, since the R+1$^{th}$ (that is, 17$^{th}$) to N$^{th}$ (that is, 64$^{th}$) transform coefficients in the target block 900 of FIG. 9 are each 0, and may be assigned to the subgroups B, E, and F, the last non-zero transform coefficient may be derived within the range of the subgroups A, C, D, G, H, I, J, K, L, M, N, O, and P other than the subgroups B, E, and F. The subgroups B, E, and F may be excluded in the process of deriving and coding the last non-zero transform coefficient, thereby enhancing computation and coding efficiency.

In addition, when the subgroups B, E, and F are excluded from the determination range in the process of deriving the last non-zero transform coefficient according to the aforementioned second exemplary embodiment, the location of the last non-zero transform coefficient may be derived more efficiently. For example, when the coordinates of the transform coefficient located at the top-left of the target block 900 are (0, 0), the coordinates of the transform coefficient located at the top-left of the subgroup J are (4, 8). When the non-zero transform coefficient is located at the top-left of the subgroup J, according to the second exemplary embodiment, it may be considered that the transform coefficients included in the subgroups B, E, and F are excluded from the determination range, and the subgroup J is located in an area where one of the subgroups B, E, and F is located, such that the coordinates of the non-zero transform coefficient may be regarded as one of (4, 0), (0, 4), and (4, 4). Accordingly, if the transform coefficients included in the subgroups B, E, and F are excluded from the determination range, a value of at least one of the x coordinate and the y coordinate of the last non-zero transform coefficient may be decreased, when compared to (4, 8) which are the coordinates of the last non-zero transform coefficient before exclusion. If the value of one of the x coordinate and the y coordinate of the last non-zero transform coefficient decreases from 8 to 4, for example, the required binary code may be decreased from 3 bits to 2 bits, and the coding efficiency may also be enhanced by decreasing the number of bits in the binary code. Meanwhile, the aforementioned example is for convenience of description, and according to the second exemplary embodiment, the location of the last non-zero transform coefficient may be efficiently derived in various similar methods other than the aforementioned examples.

In addition, the aforementioned second exemplary embodiment may omit the encoding or the decoding of the group flag information corresponding to the subgroups B, E, and F. This is because the transform coefficients assigned to the subgroups B, E, and F are all 0, and thus it is obvious that the group flag will indicate 0. This corresponds to the case where the group flag of the subgroup is not encoded or decoded, if it is determined that the subgroup in the S810 of FIG. 8A and the S860 of FIG. 8B described above is a subgroup including only the transform coefficients in the range of the R+1$^{th}$ to N$^{th}$ transform coefficients.

Meanwhile, the first exemplary embodiment and the second exemplary embodiment described above are divided merely for convenience of description, and the scope of the present disclosure should not be interpreted as being limited to the first exemplary embodiment and the second exemplary embodiment. It should be interpreted that the exemplary embodiments which are apparently derived from the first exemplary embodiment and the second exemplary embodiment and exemplary embodiments similar to the first exemplary embodiment and the second exemplary embodiment also fall within the scope of the present disclosure. In addition, the specific examples described above in connection with each of the first exemplary embodiment and the second exemplary embodiment are also for explaining the present disclosure, and the first exemplary embodiment and the second exemplary embodiment should not be interpreted as being limited to the aforementioned specific examples. It should be interpreted that examples obviously derived from the aforementioned specific examples and examples similar to the aforementioned specific examples fall within the scope of the first exemplary embodiment and the second exemplary embodiment.

Figure 10:
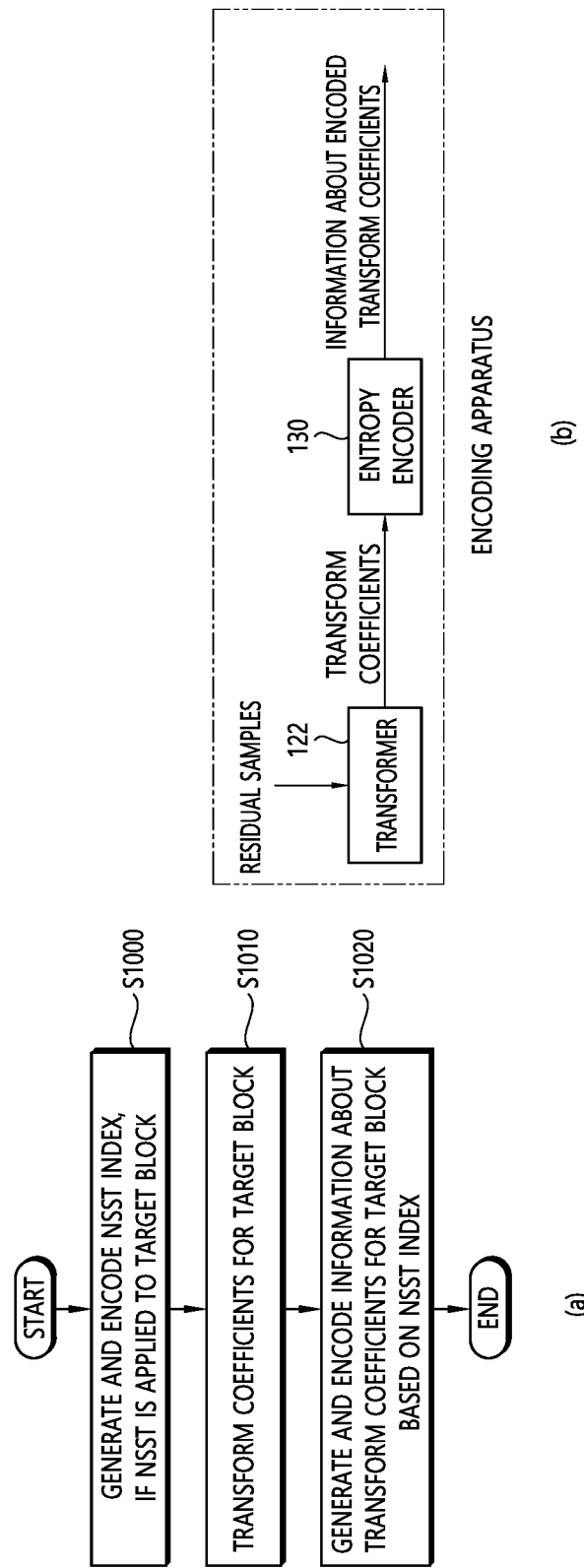
FIG. 10 is a flowchart illustrating an operation of a video encoding apparatus according to an exemplary embodiment of the present disclosure.

FIG. 10 is a flowchart illustrating an operation of a video encoding apparatus according to an exemplary embodiment of the present disclosure.

Each step illustrated in FIG. 10 may be performed by the encoding apparatus 100 illustrated in FIG. 1. More specifically, S1000 and S1020 may be performed by the entropy encoder 130 illustrated in FIGS. 1, and S1010 may be performed by the transformer 122 illustrated in FIG. 1. In addition, the operations of the S1000 to the S1020 are based on some of the contents described above with reference to FIGS. 4A to 9. Accordingly, detailed descriptions overlapping with the contents described above with reference to FIGS. 1, and 4A to 9 will be omitted or simplified.

The encoding apparatus 100 according to an exemplary embodiment may generate and encode the NSST index, if the NSST is applied to the target block (S1000). More specifically, the entropy encoder 130 may determine whether the condition for performing the NSST for the target block is satisfied, and if the condition for performing the NSST is satisfied and thus the NSST is applied to the target block, the NSST index may be generated and encoded.

The encoding apparatus 100 according to an exemplary embodiment may transform coefficients for the target block (S1010). More specifically, the transformer 122 may transform the coefficients for the target block. The transformer 122 may first apply the primary transform to the coefficients for the target block, and then apply the NSST to the block to which the NSST is applied among the target blocks. When the primary transform and the NSST are applied to the coefficients for the target block, the transform coefficients for the target block may be derived.

At this time, the NSST may be applied, based on the reduced transform, to the block to which the NSST is applied among the target blocks. If the NSST is applied based on the reduced transform and the NSST index is greater than 0, the $R+1^{th}$ (where R means the reduced coefficient of the reduced transform) to $N^{th}$ transform coefficients (where N means the square of the length of one side of the block to which the NSST is applied) for the target block may be determined as zero.

The encoding apparatus 100 according to an exemplary embodiment may generate and encode the information about the transform coefficients for the target block based on the NSST index (S1020). If the NSST is applied based on the reduced transform and the NSST index is greater than 0, the entropy encoder 130 may generate and encode the information about the transform coefficients for the target block considering that the $R+1^{th}$ to $N^{th}$ transform coefficients for the target block are 0.

Referring to the S1000 and the S1020, it may be confirmed that the NSST index is encoded prior to the information about the transform coefficients for the target block. The NSST index may be generated and encoded prior to the information about the transform coefficients for the target block, thereby enhancing accuracy and efficiency of the coding process for estimating residual data.

The information about the transform coefficients for the target block may include, for example, at least one of information about the location of the last non-zero transform coefficient, group flag information indicating whether the non-zero transform coefficient is included in the subgroup of the target block, and information about the reduced coefficient (R).

As an example, if the NSST is applied based on the reduced transform and the NSST index is greater than 0, the entropy encoder 130 of the encoding apparatus 100 may derive the non-zero transform coefficient among the transform coefficients other than the $R+1^{th}$ to $N^{th}$ transform coefficients considering that the $R+1^{th}$ to $N^{th}$ transform coefficients for the target block are 0. Accordingly, the computational efficiency of the encoding apparatus 100 may be enhanced. In addition, by encoding the non-zero transform coefficient among the transform coefficients other than the $R+1^{th}$ to $N^{th}$ transform coefficients, as described above with reference to FIG. 9, it is possible to decrease the number of bits, thereby enhancing the coding efficiency of the encoding apparatus 100.

As another example, if the NSST is applied based on the reduced transform and the NSST index is greater than 0, the entropy encoder 130 of the encoding apparatus 100 may omit the encoding for the group flag information corresponding to the subgroup including only the transform coefficients in the range of the $R+1^{th}$ to $N^{th}$ transform coefficients considering that the $R+1^{th}$ to $N^{th}$ transform coefficients for the target block are 0. Accordingly, the coding efficiency of the encoding apparatus 100 may be enhanced.

Figure 11:
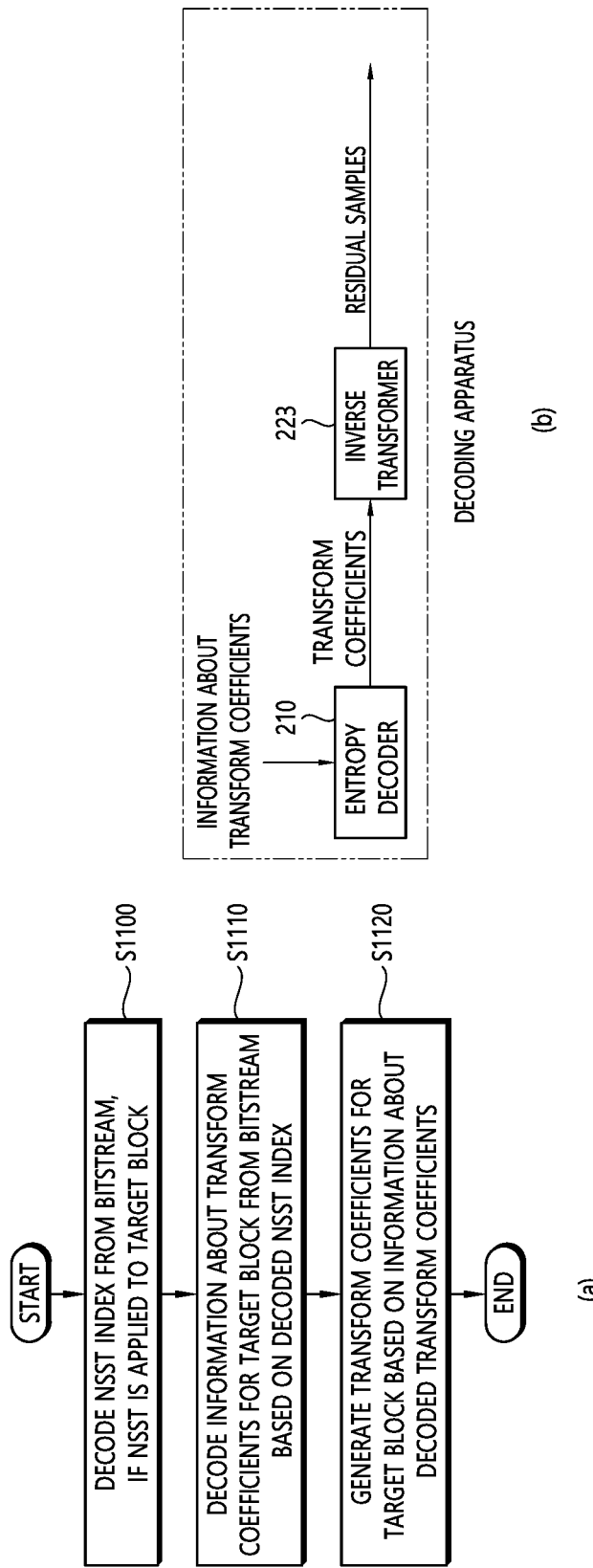
FIG. 11 is a flowchart illustrating an operation of a video decoding apparatus according to an exemplary embodiment of the present disclosure.

FIG. 11 is a flowchart illustrating an operation of a video decoding apparatus according to an exemplary embodiment of the present disclosure.

Each step illustrated in FIG. 11 may be performed by the decoding apparatus 200 illustrated in FIG. 2. More specifically, the S1100 to the S1120 may be performed by the entropy decoder 130 illustrated in FIG. 2. In addition, the operations of the S1100 to the S1120 are based on some of the contents described above with reference to FIGS. 4A to 9. Accordingly, detailed descriptions overlapping with the contents described above with reference to FIGS. 2 and 4A to 9 will be omitted or simplified.

The decoding apparatus 200 according to an exemplary embodiment may decode the NSST index from a bitstream, if the NSST is applied to the target block (S1100). More specifically, the entropy decoder 210 may determine whether the condition for performing the NSST for the target block is satisfied, and decode the NSST index from the bitstream, if the condition for performing the NSST is satisfied and thus the NSST is applied to the target block.

The decoding apparatus 200 according to an exemplary embodiment may decode the information about the transform coefficients for the target block from the bitstream based on the decoded NSST index (S1110). At this time, the NSST may be applied, based on the reduced transform, to the block to which the NSST is applied among the target blocks in the encoding apparatus 100. If the NSST is applied based on the reduced transform in the encoding apparatus 100 and the NSST index is greater than 0, the $R+1^{th}$ to $N^{th}$ transform coefficients for the target block may be determined as 0. Referring to the S1100 and the S1110, it may be confirmed that the NSST index is decoded prior to the information about the transform coefficients for the target block. The NSST index may be decoded prior to the information about the transform coefficients for the target block, thereby enhancing accuracy and efficiency of the coding process for estimating residual data.

If the NSST is applied based on the reduced transform in the encoding apparatus 100 and the NSST index is greater than 0, the entropy decoder 210 may decode the information about the transform coefficients for the target block from the bitstream considering that the $R+1^{th}$ to $N^{th}$ transform coefficients for the target block are 0.

The information about the transform coefficients for the target block may include, for example, at least one of the information about the location of the last non-zero transform coefficient, the group flag information indicating whether the non-zero transform coefficient is included in the subgroup of the target block, and the information about the reduced coefficient (R).

As an example, if the NSST is applied based on the reduced transform and the NSST index is greater than 0, the entropy decoder 210 of the decoding apparatus 200 may decode the non-zero transform coefficient among the transform coefficients other than the $R+1^{th}$ to $N^{th}$ transform coefficients, thereby enhancing the coding efficiency of the decoding apparatus 200 by decreasing the number of bits, as illustrated in FIG. 9.

As another example, if the NSST is applied based on the reduced transform and the NSST index is greater than 0, the entropy decoder 210 of the decoding apparatus 200 may omit the decoding for the group flag information corresponding to the subgroup including only the transform coefficients in the range of the $R+1^{th}$ to $N^{th}$ transform coefficients considering that the $R+1^{th}$ to $N^{th}$ transform coefficients for the target block are 0. As a result, the coding efficiency of the decoding apparatus 200 may be enhanced.

The decoding apparatus 200 according to an exemplary embodiment may generate (or derive) the transform coefficients for the target block based on the information about the decoded transform coefficients (S1120). For example, the entropy decoder 210 may generate (derive) the transform coefficients for the target block based on at least one of the information about the location of the last non-zero transform coefficient, the group flag information indicating whether the non-zero transform coefficient is included in the subgroup of the target block, and the information about the reduced coefficient (R).

The inverse transformer 223 according to an exemplary embodiment may derive coefficients (or residual samples) for the target block by inversely transforming the transform coefficients for the target block based on the NSST index.

The adder (or reconstructor) 240 according to an exemplary embodiment may generate the reconstructed picture based on the coefficients (or the residual samples) for the target block obtained from the inverse transformer 223 and the prediction samples for the target block obtained from the predictor 230.

The aforementioned method according to the present disclosure may be implemented in a software form, and the encoding apparatus and/or the decoding apparatus according to the present disclosure may be included in an apparatus for performing the image processing such as a TV, a computer, a smart phone, a set-top box, or a display device.

When the exemplary embodiments of the present disclosure are implemented in software, the aforementioned method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a read-only memory (ROM), a random access memory (RAM), a flash memory, a memory card, a storage medium, and/or other storage device.

What is claimed is:

1. A decoding apparatus for an image decoding, the decoding apparatus comprising:

a memory; and at least one processor connected to the memory, the at least one processor configured to:

acquire information about transform coefficients for a target block from the bitstream;

derive transform coefficients for the target block based on the information about the transform coefficients;

derive residual samples for the target block by performing a predefined inverse transform based on the transform coefficients; and generate reconstructed samples based on the residual samples, wherein based on a case that the predefined inverse transform is applied, transform coefficients for the target block in a remaining region other than a top-left target region of the target block are equal to 0, wherein a size of an input target region for the predefined inverse transform is smaller than a size of an output target region for the predefined inverse transform, wherein the input target region is equal to the top-left target region, wherein the information about the transform coefficients for the target block includes information about a location of a last non-zero transform coefficient, and wherein based on the case that the predefined inverse transform is applied, the last non-zero transform coefficient is one of transform coefficients in the top-left target region.

2. An encoding apparatus for an image encoding, the encoding apparatus comprising:

a memory; and at least one processor connected to the memory, the at least one processor configured to:

derive residual samples for a target block;

generate transform coefficients for the target block by performing a predefined transform based on the residual samples;

generate information about the transform coefficients for the target block; and encode the information about the transform coefficients, wherein based on a case that the predefined transform is applied, transform coefficients in a remaining region other than a top-left target region of the target block are equal to 0, wherein a size of an input target region for the predefined transform is greater than a size of an output target region for the predefined transform, wherein the output target region is equal to the top-left target region, wherein the information about the transform coefficients for the target block includes information about a location of a last non-zero transform coefficient, and wherein based on the case that the predefined transform is applied, the last non-zero transform coefficient is one of transform coefficients in the top-left target region.

3. An apparatus for transmitting data for an image, the apparatus comprising:

at least one processor configured to obtain a bitstream for the image, wherein the bitstream is generated based on deriving residual samples for a target block, generating transform coefficients for the target block by performing a predefined transform based on the residual samples, generating information about the transform coefficients for the target block, and encoding the information about the transform coefficients; and transmitting the data comprising the bitstream, wherein based on a case that the predefined transform is applied, transform coefficients in a remaining region other than a top-left target region of the target block are equal to 0, wherein a size of an input target region for the predefined transform is greater than a size of an output target region for the predefined transform, wherein the output target region is equal to the top-left target region, wherein the information about the transform coefficients for the target block includes information about a location of a last non-zero transform coefficient, and wherein based on the case that the predefined transform is applied, the last non-zero transform coefficient is one of transform coefficients in the top-left target region.

* * * * *